(12) United States Patent
Friestad, Jr. et al.

(10) Patent No.: US 10,837,709 B2
(45) Date of Patent: Nov. 17, 2020

(54) HEAT EXCHANGER

(71) Applicant: Honeywell International Inc., Morris Plains, NJ (US)

(72) Inventors: Ronald J. Friestad, Jr., LaVerne, CA (US); Raunlfo C. Molina, Los Angeles, CA (US)

(73) Assignee: Honeywell International Inc., Charlotte, NC (US)

( * ) Notice: Subject to any disclaimer, the term of this patent is extended or adjusted under 35 U.S.C. 154(b) by 72 days.

(21) Appl. No.: 16/182,374

(22) Filed: Nov. 6, 2018

(65) Prior Publication Data

US 2020/0141655 A1 May 7, 2020

(51) Int. Cl.
| | |
|---|---|
| *F28F 3/00* | (2006.01) |
| *F28D 9/00* | (2006.01) |
| *F28F 9/00* | (2006.01) |
| *B64D 13/08* | (2006.01) |
| *B64D 13/06* | (2006.01) |
| *F28D 21/00* | (2006.01) |

(52) U.S. Cl.
CPC ......... *F28D 9/0006* (2013.01); *F28D 9/0062* (2013.01); *F28F 9/001* (2013.01); *B64D 13/08* (2013.01); *B64D 2013/0603* (2013.01); *F28D 2021/0021* (2013.01); *F28F 2280/04* (2013.01)

(58) Field of Classification Search
CPC .................. F28D 9/0006; F28D 9/0062; F28D 2021/0021; F28F 9/001; F28F 2280/04; B64D 13/08; B64D 2013/0603
USPC .......................................................... 165/166
See application file for complete search history.

(56) References Cited

U.S. PATENT DOCUMENTS

| | | | |
|---|---|---|---|
| 3,262,496 A | 7/1966 | Bawabe | |
| 4,301,863 A | 11/1981 | Bizzarro | |
| 4,688,629 A | 8/1987 | Kohnken | |
| 5,183,106 A | 2/1993 | Stancliffe et al. | |

(Continued)

FOREIGN PATENT DOCUMENTS

| | | |
|---|---|---|
| EP | 0117565 A2 | 2/1984 |
| EP | 2597412 A1 | 5/2013 |

(Continued)

OTHER PUBLICATIONS

U.S. Appl. No. 16/540,761, by Honeywell Aerospace (Inventors: Barriga et al.), filed Aug. 14, 2019.

(Continued)

*Primary Examiner* — Davis D Hwu
(74) *Attorney, Agent, or Firm* — Shumaker & Sieffert, P.A.

(57) ABSTRACT

In some examples, a heat exchanger includes an outer shell defining an open cavity configured to receive heat exchanger core components. The heat exchanger core components may include a layer of hot passageway components configured to be separated from a layer of cold passageway components by a tube sheet. In some examples, the outer shell defines one or more alignment features on an inner wall of the open cavity, the one or more alignment features being configured to align the heat exchanger core components within the open cavity when inserted in the open cavity. The heat exchanger further comprises a cover configured to be attached to the outer shell via one or more braze joints to enclose the core components within the open cavity of the outer shell.

20 Claims, 20 Drawing Sheets

(56) References Cited

U.S. PATENT DOCUMENTS

| | | |
|---|---|---|
| 6,267,176 B1 | 7/2001 | Bolla et al. |
| 6,883,502 B2 | 4/2005 | Nechvatal |
| 6,962,194 B2 | 11/2005 | Dana |
| 8,955,578 B2 | 2/2015 | Kwon et al. |
| 9,671,168 B2 | 6/2017 | Glück |
| 9,797,350 B2 | 10/2017 | Jasper |
| 10,175,007 B2 | 1/2019 | Wang et al. |
| 2002/0038703 A1* | 4/2002 | Maeda ............... B01B 1/005 165/168 |
| 2008/0202724 A1* | 8/2008 | Lorenz ............... F28D 7/0075 165/51 |
| 2008/0236802 A1 | 10/2008 | Koepke |
| 2009/0101321 A1 | 4/2009 | Ostersetzer et al. |
| 2009/0266104 A1* | 10/2009 | Ichiyanagi ............ F25B 39/00 62/498 |
| 2012/0000633 A1 | 1/2012 | Malugani et al. |
| 2014/0231054 A1 | 8/2014 | Martins |
| 2019/0049187 A1 | 2/2019 | Zeidner et al. |
| 2019/0257595 A1 | 8/2019 | Barriga et al. |

FOREIGN PATENT DOCUMENTS

| | | |
|---|---|---|
| EP | 2971991 A4 | 3/2017 |
| EP | 3306207 A1 | 4/2018 |
| GB | 838466 A | 6/1960 |
| JP | 2006322641 A | 11/2006 |
| WO | 2014116172 A1 | 7/2014 |

OTHER PUBLICATIONS

Examination Report from counterpart European Application No. 19207012.6, dated Apr. 2, 2020, 5 pp.

Prosecution History from U.S. Appl. No. 15/899,362, dated Dec. 10, 2019 through May 27, 2020, 20 pp.

Communication under Rule 71(3) EPC from counterpart European Application No. 19207012.6, dated Jul. 23, 2020, 101 pages.

* cited by examiner

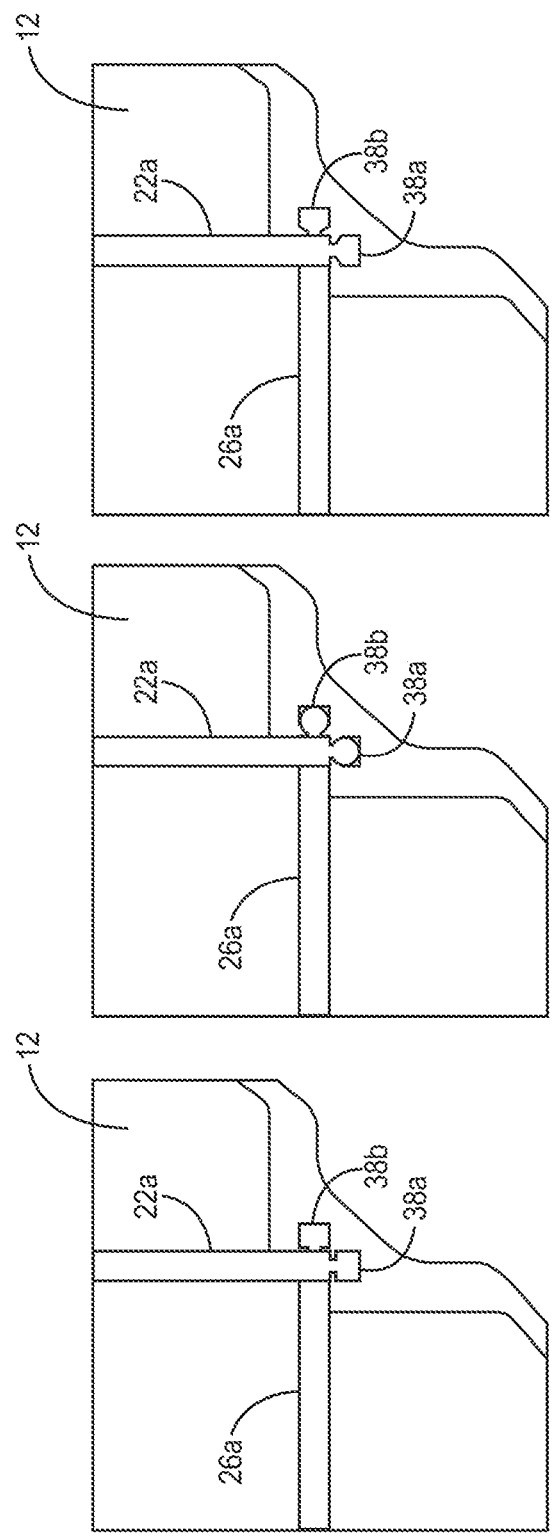

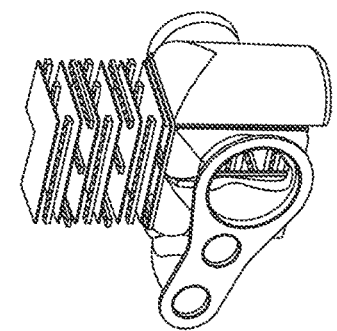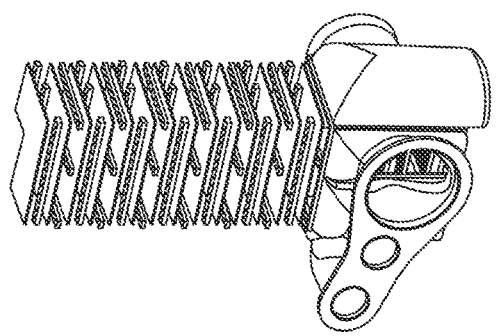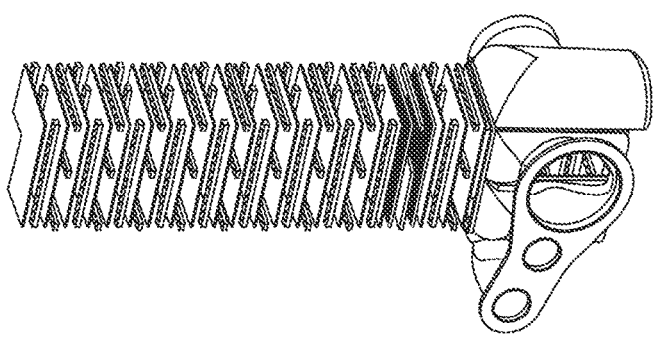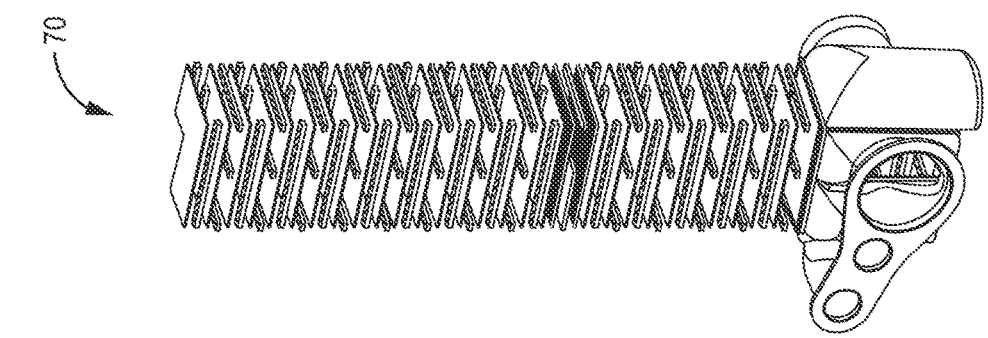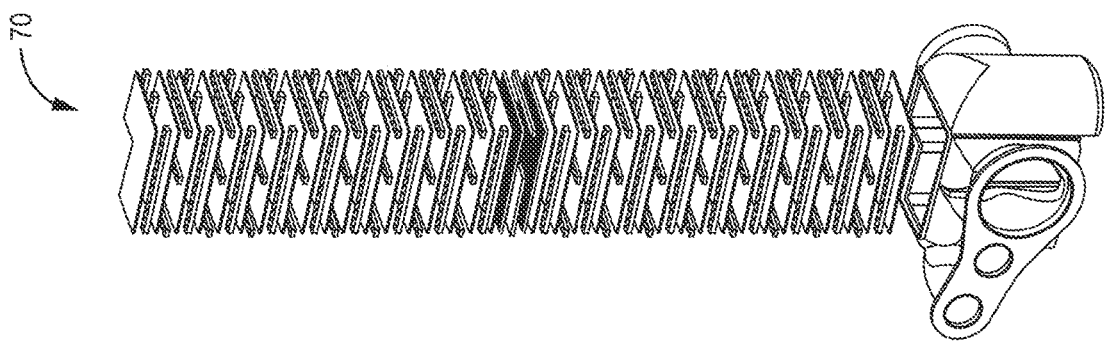

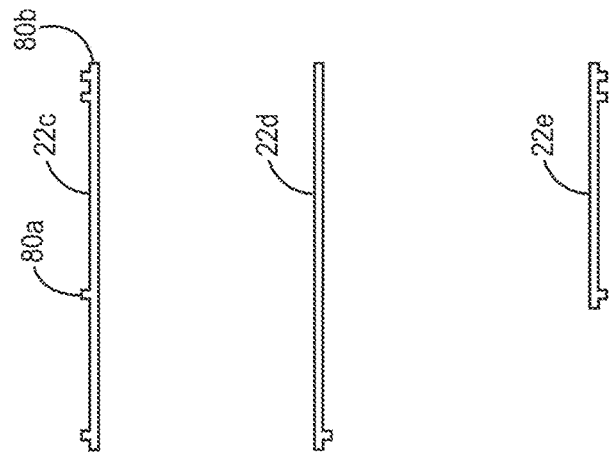
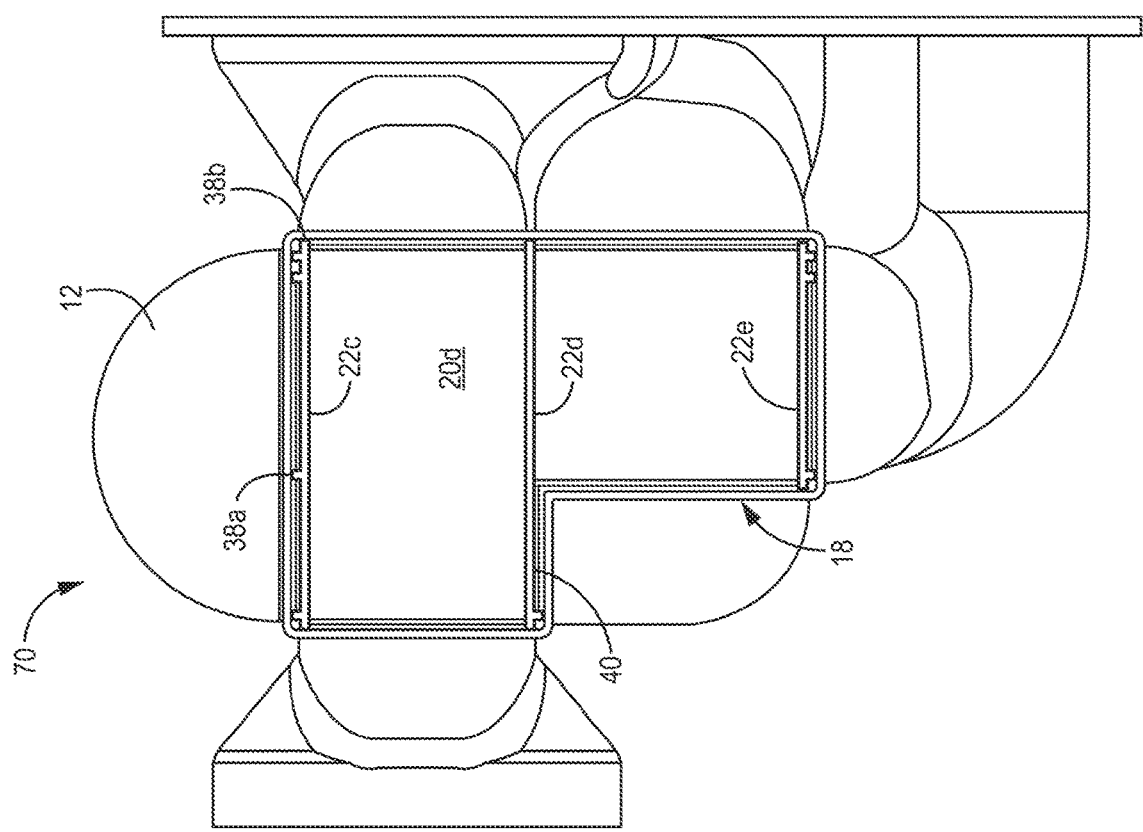

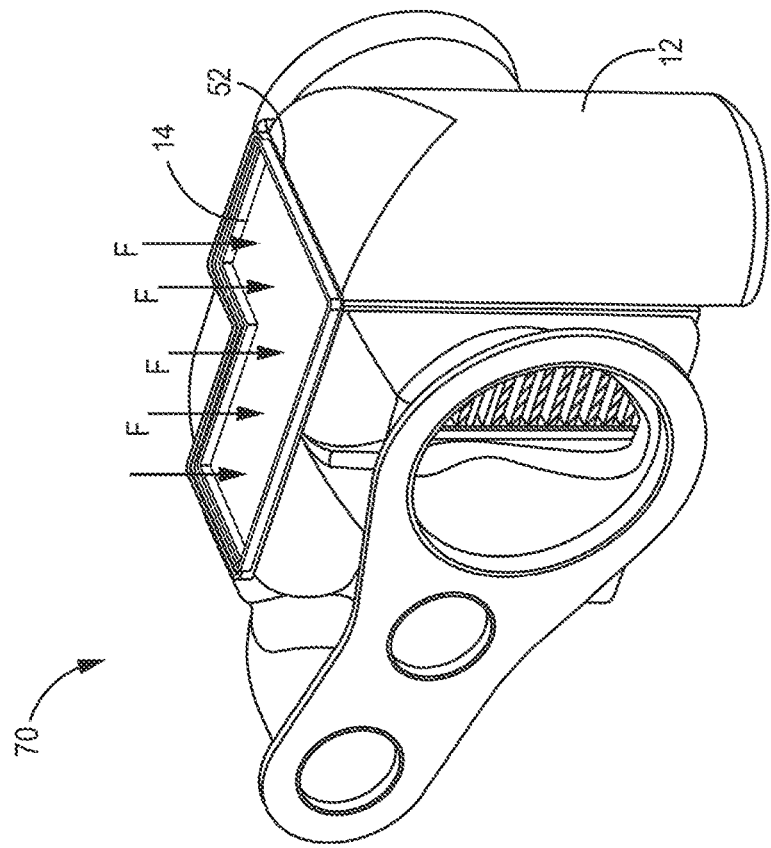
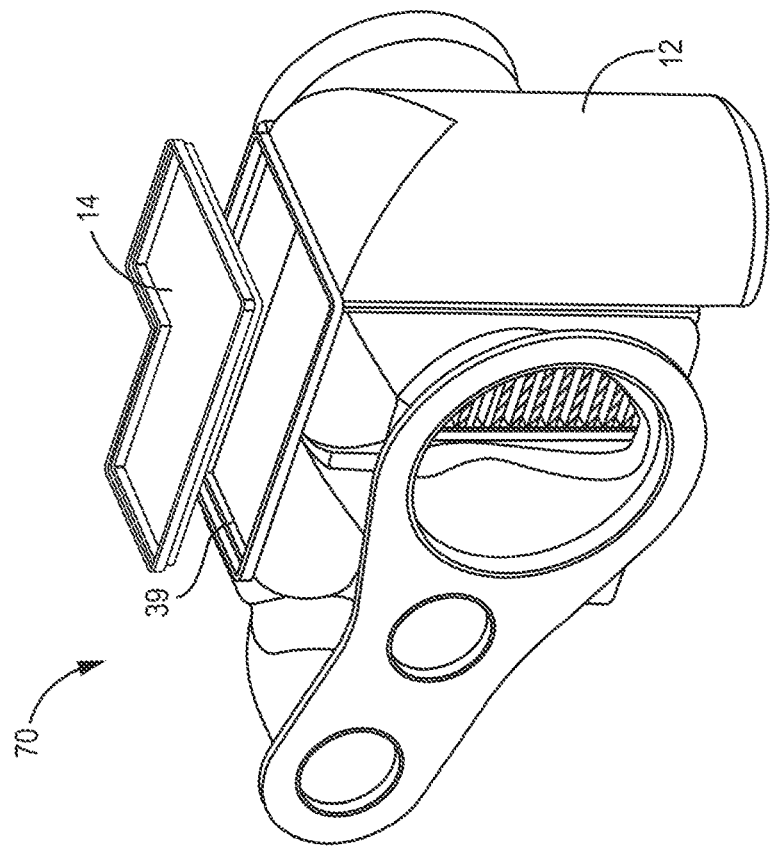
FIG. 12A
FIG. 12B

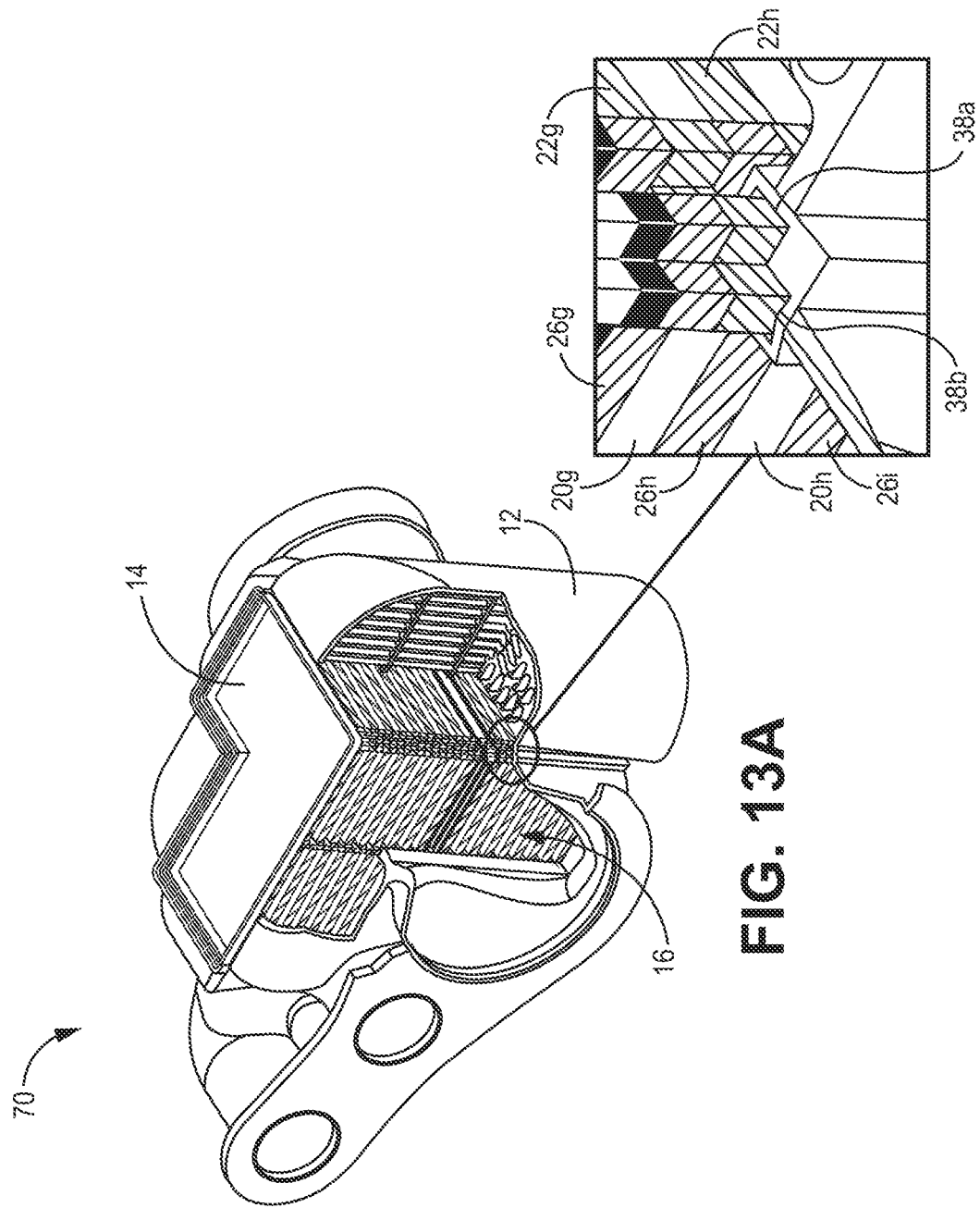

HEAT EXCHANGER

TECHNICAL FIELD

The present disclosure relates to heat exchangers.

BACKGROUND

An environmental control system (ECS), such as an aircraft ECS, may include one or more heat exchangers. Such heat exchangers may be of the fluid-to-fluid type, either gas or liquid, and may include a core assembly including alternating rows of heat transfer fins and plates. The rows are interposed to create multiple hot and cold side passageways extending through the core assembly. The passageways may create a counter-flow, parallel flow, or cross-flow heat exchange relationship between fluids flowing through the passageways. During operation, heat is exchanged between the fluids flowing through the core assembly. Because an aircraft ECS often operates at, and generates within itself, relatively extreme temperature and pressure conditions, the heat exchanger may be subjected to the adverse effects of temperatures as well as the forces generated by operation of the aircraft. The heat exchanger may be manufactured to function in such a hostile environment.

SUMMARY

In some examples, the disclosure relates to a heat exchanger, such as, a plate fin heat exchanger, and a method of making a heat exchanger. The heat exchanger may include a preformed outer shell defining an inner cavity and heat exchanger core components within the inner cavity of the preformed outer shell. A cover may be attached to the outer shell via one or more braze joints to cover the inner cavity and enclose the core components within the inner cavity. In some examples, the heat exchanger core components may be attached to each other and/or to the inner surface of the cavity of the outer shell via one or more braze joints.

In some examples, the core components may be inserted and stacked within the inner cavity of the preformed outer shell (e.g., rather than being assembly with another separate external fixture). The outer shell may be preformed using, e.g., a technique that does not include welding such as additive manufacturing. When the core components are assembled within the cavity of the preformed outer shell, the braze joint(s) attaching the cover to the outer shell may be formed during the same brazing process used to form the braze joint(s) attaching the core components to each other and/or to the inner surface of the cavity of the outer shell.

In one aspect, the disclosure relates to a method for assembling a heat exchanger. The method comprises forming an outer shell of the heat exchanger, the outer shell defining an open cavity for containing heat exchanger core components, wherein the heat exchanger core components include a layer of hot passage components configured to be separated from a layer of cold passage components by a tube sheet; subsequently inserting the heat exchanger core components into the open cavity of the outer shell, wherein the outer shell defines one or more alignment features on an inner wall of the open cavity configured to align the heat exchanger core components within the open cavity when inserted in the open cavity; and attaching a cover to the outer shell via one or more braze joints to enclose the core components within the open cavity of the outer shell.

In another aspect, the disclosure relates to a heat exchanger assembly. The heat exchanger assembly comprises an outer shell defining a cavity; heat exchanger core components within the cavity of the outer shell, wherein the heat exchanger core components include a layer of hot passage components configured to be separated from a layer of cold passage components by a tube sheet; and a cover attached, via one or more braze joints, to the outer shell to enclose the heat exchanger core components within the cavity, wherein the outer shell defines one or more alignment features on an inner wall of the open cavity configured to align the heat exchanger core components within the open cavity when inserted in the open cavity This summary is intended to provide an overview of the subject matter described in this disclosure. It is not intended to provide an exclusive or exhaustive explanation of the systems, devices, and methods described in detail within the accompanying drawings and description below. Further details of one or more examples are set forth in the accompanying drawings and the description below. Other features, objects, and advantages will be apparent from the description and drawings, and from the statements provided below.

BRIEF DESCRIPTION OF THE FIGURES

FIGS. 5A-5C are conceptual diagrams illustrating example alignment feature configurations.

FIGS. 8A-8E are conceptual diagrams illustrating a process for assembling the plate fin heat exchanger of FIG. 7.

FIGS. 11A and 11B are conceptual diagrams illustrating a partially assembled and cold enclosure bars of the plate fin heat exchanger of FIG. 7.

FIGS. 12A and 12B are conceptual diagrams illustrating attached of the cover of the plate fin heat exchanger of FIG. 7.

FIGS. 13A and 13B are conceptual diagrams illustrating view of the plate fin heat exchanger of FIG. 7.

DETAILED DESCRIPTION

Figure 1:
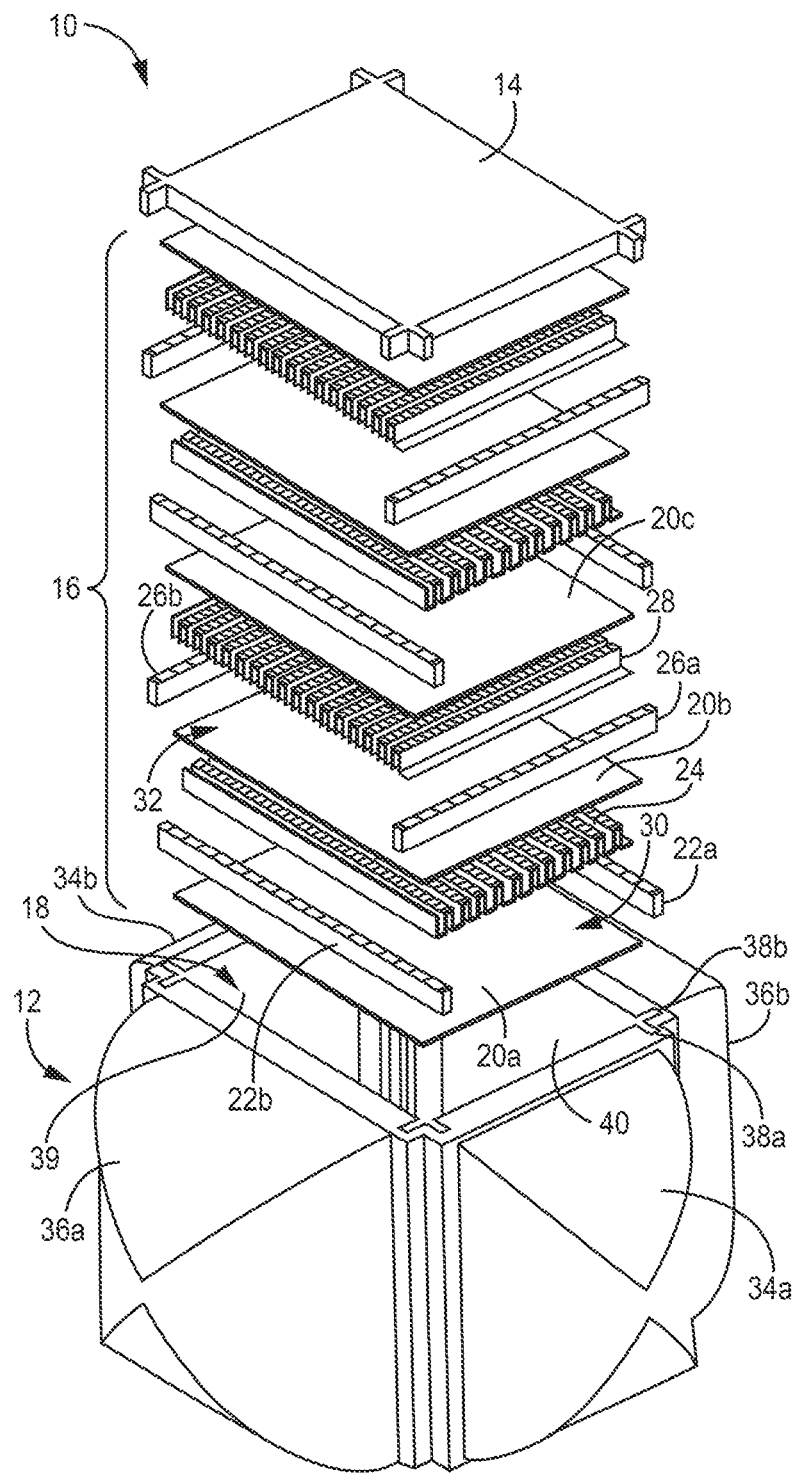
FIG. 1 is a conceptual diagram illustrating an exploded view of an example plate fin heat exchanger.

In some examples, the disclosure describes heat exchangers and techniques for making such heat exchangers. Heat exchanger are employed in a variety of applications, such as, but not limited to, in an ECS of an aircraft. One example of a heat exchanger that may be used in an ECS of an aircraft (or other applications) is a plate fin heat exchanger.

In some examples, a plate fin heat exchanger may be manufactured by stacking the heat exchanger core components, e.g., cold and hot enclosure bars, tube sheets, side plates and fins, in a tooling fixture, which may wear over time and need to be replaced. The core component stack inserted in the tooling fixture may start with a side plate as the base, then a tube sheet may be added, followed by the addition of hot bars and fins of a "hot" section (e.g., a passageway in which relatively hot fluid may flow during operation of the heat exchanger), followed by the addition of another tube sheet on the hot bars and fins, and then followed by the addition cold bars and fins of a "cold" section (e.g., a passageway in which relatively cold fluid may flow during operation of the heat exchanger). The process of forming alternating layers of hot passageway components and cold passageway components separated by tube sheets may be repeated until the correct number of hot and cold passageways are achieved. A side plate similar or identical to the base side plate may then be added on the top of the stack in the fixture.

The stack of core components may then be heated in an oven to achieve the brazing of the core components to each other. Once the core component stack is completed and brazed, inlet and outlet heat exchanger pans, which form part of the outer shell of the heat exchanger, may be welded to the core components. The process of welding the pans to the stack of core components may cause the braze material attaching the core components to each other to melt, since the welding may be done at a higher temperature than brazing, causing unwanted leaks, e.g., in the complete outer shell and/or in the hot and cold passageways of the previously formed core component stack.

In accordance with some examples of the disclosure, a technique may be employed to form a plate fin heat exchanger in which there is no welding of outer shell of the heat exchanger or other components after the core component assembly is brazed together. As described herein, an outer shell that is configured to define an open cavity in which the core components of a plate fin heat exchanger are subsequently enclosed, may be formed, e.g., via welding inlet and outlet pans and other pans of the outer shell to each other, prior to brazing the components of the core components together. The preformed outer shell may define an open inner cavity and an aperture into which the components of the core may be inserted to stack the core components within the open cavity of the outer shell. In this manner, the preformed outer shell may be used in place of a fixture for stacking the core components.

Once the core components have been stacked within the preformed outer shell, a cover may be positioned to close the open cavity in the outer shell and enclose the stacked core components within the outer shell and cover. The cover may be attached to the outer shell using any suitable technique, such as by brazing the cover to the outer shell. Additionally, during the brazing process, the core components may also be attached to each other and to the inner surface of the outer shell. In this manner, the same brazing process may be utilized to both attach the cover to the outer shell and attach the core components to each other and to the inner surface of the outer shell. Put another way, by heating all the assembly as a whole, the cover may be brazed in place to the outer shell at the same time that the core components are brazed together within the cavity of the outer shell. This may result in a more efficient process for forming the heat exchanger by eliminating the separate step of mechanically coupling (e.g., by welding) the cover to the outer shell. Such a process may eliminate the use of welding to attach a cover to the outer shell, which prevents welding from interfering with braze joints attaching the core components within the outer shell and/or braze joints attaching the core components to each other.

In some examples, the preformed outer shell may include one or more alignment features (e.g., grooves and/or protrusions) that assist in aligning the core components within the open inner cavity of the outer shell when the core components are stacked within the inner cavity. For example, the inner walls of the outer shell may include one or more grooves into which the core components are configured to mate with and slide into when being stacked in the outer shell. The grooves or other alignment features in the outer shell may assist in aligning the core components as desired directly within the outer shell, e.g., rather than first utilizing a separate fixture to first stack and align the core components.

In some examples, the alignment features may also be configured to aid in retention of at least some of the core components in place within the outer shell, e.g., during operation of the heat exchanger at elevated pressures within the hot and cold passageways. For example, the mating between one or more core components and respective alignment features (e.g., between the hot and cold enclosure bars and alignment grooves) may provide a mechanical interlock between the outer shell and the one or more core components. Additionally or alternatively, braze joints may be formed between at least some of the core components and the outer shell at the respective alignment features where the portions of the particular core components mate with the respective alignment features. In some examples, such additional attachment between the core components and outer shell may increase the pressure under which the heat exchanger may operate, e.g., by increasing the strength of attachment between the individual core components as well as the attachment between the core components and the outer shell. The increased strength of attachment may increase the load under which the heat exchanger may operate. In the case where hot and cold enclosure bars of the core components have simple ends that are placed in simple alignment grooves formed in the inner wall of the outer shell, the structural attachment between the two components may be face to face. With the more complex enclosure bar end designs the braze alloy may fill the grooves, e.g., to form a positive interlock, which would have to be torn in order break the joint.

In some examples, rather than welding multiple pans to each other to form an outer shell for the heat exchanger, other techniques that do not include welding portions of the outer shell together to define the outer shell (or a part of the outer shell) may be employed. In some examples, the outer shell of the heat exchanger including the inner cavity may be formed via a casting, machining, or an additive manufacturing process (e.g., three-dimensional (3D) printing). In some example, the non-welding techniques may be employed to form the outer shell, e.g., as a single, monolithic piece. In some cases, additive manufacturing of the outer shell may allow for a complex external shape to be created along with the internal fixturing features (e.g., alignment features) that help locate the core components that get stacked inside the outer shell. Eliminating the welding of the pans around and/or to the core components may eliminate the possibility of melting portions of the brazed joints when the outer core is formed and causing leaks within the core of the heat exchanger that either have to be repaired or lead to the heat exchanger assembly being replaced.

The use of additive manufacturing or other non-welding manufacturing techniques to form an outer shell may be less costly than then welding techniques, e.g., since the relatively complex outer shell may be 3D printed as one unitary structure with a separate cover and not as multiple individual components that are trimmed to fit and welded in place around a preformed core component assembly. Despite the different manufacturing technique for the outer shell, the number of individual core components may remain the same for each design. 3D printing of the outer shell may also eliminate the problem of accessing some difficult to access areas of the heat exchanger assembly to perform required welding procedures in cases in which the outer shell is welded in place around a preformed assembly of the core components.

FIG. 1 is a conceptual diagram illustrating an exploded view of an example plate fin heat exchanger assembly 10. Heat exchanger assembly 10 includes outer shell 12, cover 14, and core components 16. Outer shell 12 defines an open cavity 18 within which core components 16 may be stacked and subsequently enclosed by attaching cover 14 to outer shell 12, e.g., using an example technique in accordance with the disclosure. Core components 16 includes a plurality of tube sheets 20 (only individual tube sheets 20a-20c are labelled in FIG. 1 for clarity) which separate alternating hot and cold passageway layers of heat exchanger 10. Each cold passageway layer of core components 16 includes cold enclosure bars 22 (only individual cold bars 22a and 22b are labeled for clarity) and cold fins 24. Each hot passageway layer of core components 16 includes hot enclosure bars 26 (only individual hot bars 26a and 26b are labeled for clarity) and hot fins (not shown).

When heat exchanger 10 shown in FIG. 1 is assembled, the "bottom" layer of core components 16 may form cold fluid passageway 30 bounded by tube sheet 20b on "top," tube sheet 20a on "bottom" and individual cold enclosure bars 22a and 22b on two "sides." Reference to "top," "bottom," and "sides" is for ease of description only and is not intended to limit the orientation of heat exchanger 10 in operation. Cold fins 24 are located within cold fluid passageway 30 between cold enclosure bars 22a and 22b, and may define the spacing between tube sheets 20a and 20b. Similarly, the adjacent layer directly on "top" of this "bottom" layer of core components 16 may form hot fluid passageway 32 bounded by tube sheet 20c on "top," tube sheet 20b on "bottom" and individual hot enclosure bars 26a and 26b on two "sides." Hot fins 28 are located within hot fluid passageway 32 between hot enclosure bars 26a and 26b, and may define the spacing between tube sheets 20b and 20c. In heat exchanger assembly 10 in FIG. 1, core components 16 are stacked within open cavity 18 such that core components 16 include multiple layers which define alternating cold and hot passageways 30, 32.

During operation, a relatively cold fluid (e.g., cold air) may flow into heat exchanger assembly 10 via cold intake manifold 34a, through the cold passageways (such as, cold passageway 30) and out via cold outlet manifold 34b. Likewise, a relatively hot fluid (e.g., hot air) may flow into heat exchanger assembly 10 via hot intake manifold 36a, through the hot passageways (such as, hot passageway 32) and out via hot outlet manifold 36b. In this manner, heat from the hot fluid within the hot passageways (e.g., hot passageway 32) is transferred to the cold fluid within the adjacent cold passageways (e.g., cold passageway 30). Hot fins 28 and cold fins 24 form a secondary surface for heat transfer during operation to remove heat from the fluid within the hot passageways (e.g., hot passageway 32).

The tube sheets, enclosure bars, and fins may be formed of any suitable material. For example, the tube sheets, enclosure bars, and fins may be aluminum, stainless steel, nickel alloy (e.g., Inconel) and titanium components although other materials are contemplated. In some examples, all the components of a heat exchangers may be made form the same material. For example, an aluminum heat exchanger may have parts such as the tube sheets, enclosure bars, and fins made from aluminum (e.g., along with the outer shell). Likewise, a stainless steel heat exchanger may have parts such as the tube sheets, enclosure bars, and fins made from stainless steel (e.g., along with the outer shell). The braze material for joining the parts may be selected based on the composition of the parts being joined.

The hot and cold fluid passageways (e.g., passageways 30 and 32) are shown as extending approximately ninety degrees (90°) to each other, forming a cross-flow condition between fluids flowing through core components 16. However, in other examples, the fluid passageways may extend approximately parallel to each other, creating a parallel-flow condition between the fluids. Alternatively, the fluid passageways may extend in opposite directions to each other, creating a counter-flow condition between the fluids.

Regardless of the relative flow directions of the passageways within core components 16, core components 16 may be assembled within open cavity 18 of outer shell 12, e.g., rather than being assembled in a separate fixture prior to an outer shell being formed around the assembled components. As described below, once stacked within open cavity 18, the individual components of core components 16 may be brazed to each other, e.g., while cover 14 is attached to outer shell 12 via brazing to enclose core components 16 within cavity 18. During the brazing process, core components 16 may be attached to inner walls 40 of cavity 18 at one or more locations.

In some examples, outer shell 12 includes one or more alignment features configured to mate with respective components of core components 16 during the stacking of core components within open cavity 18. For example, as shown in FIG. 1, outer shell 12 includes a plurality of grooves (e.g., first groove 38a and second groove 38b) located at or near each corner of the four corners of the square-shaped open cavity 18 of outer shell 12. The plurality of grooves are formed in inner walls 40 of outer shell 12 that defines open cavity 18, and each groove is configured to receive and mate with one or more respective core components 16, e.g., an end of either a hot enclosure bar 26 or cold enclosure bar 22, during the process to assemble core components 16 within cavity 18. The mated alignment features of heat exchanger 10 are not limited to grooves formed in outer shell 12. In some examples, inner wall 40 may include one or more protrusions that mate with corresponding grooves formed in one or more core components 16, e.g., the tube sheets and/or hot and cold enclosure bars of core components 16. In some examples, inner wall 40 may include both grooves and protrusions that mate with corresponding grooves and protrusions defined by respective components of core components 16.

Figure 2A:
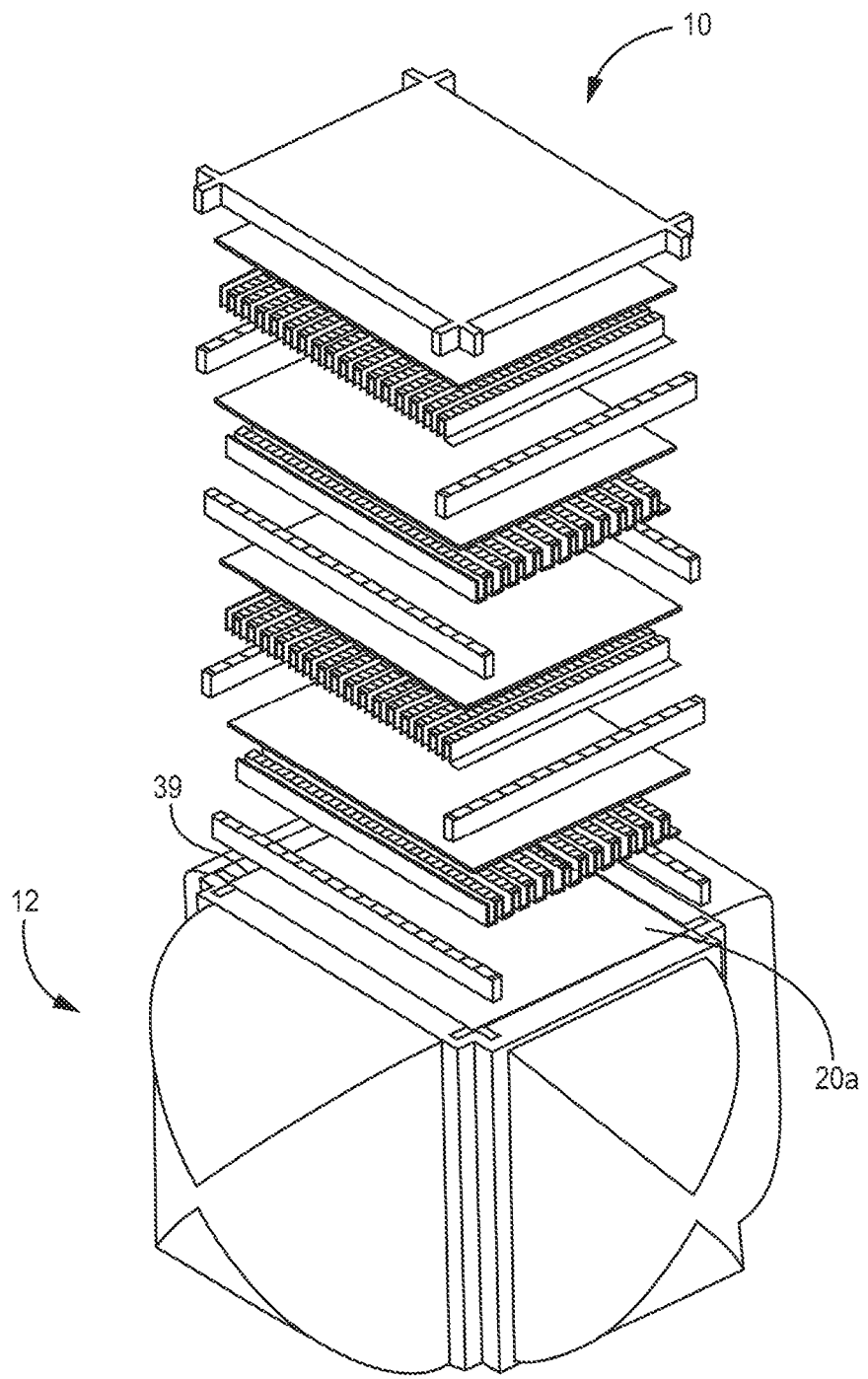
FIGS. 2A-2G are conceptual diagrams illustrating a process for assembling the plate fin heat exchanger of FIG. 1.
Figure 2B:
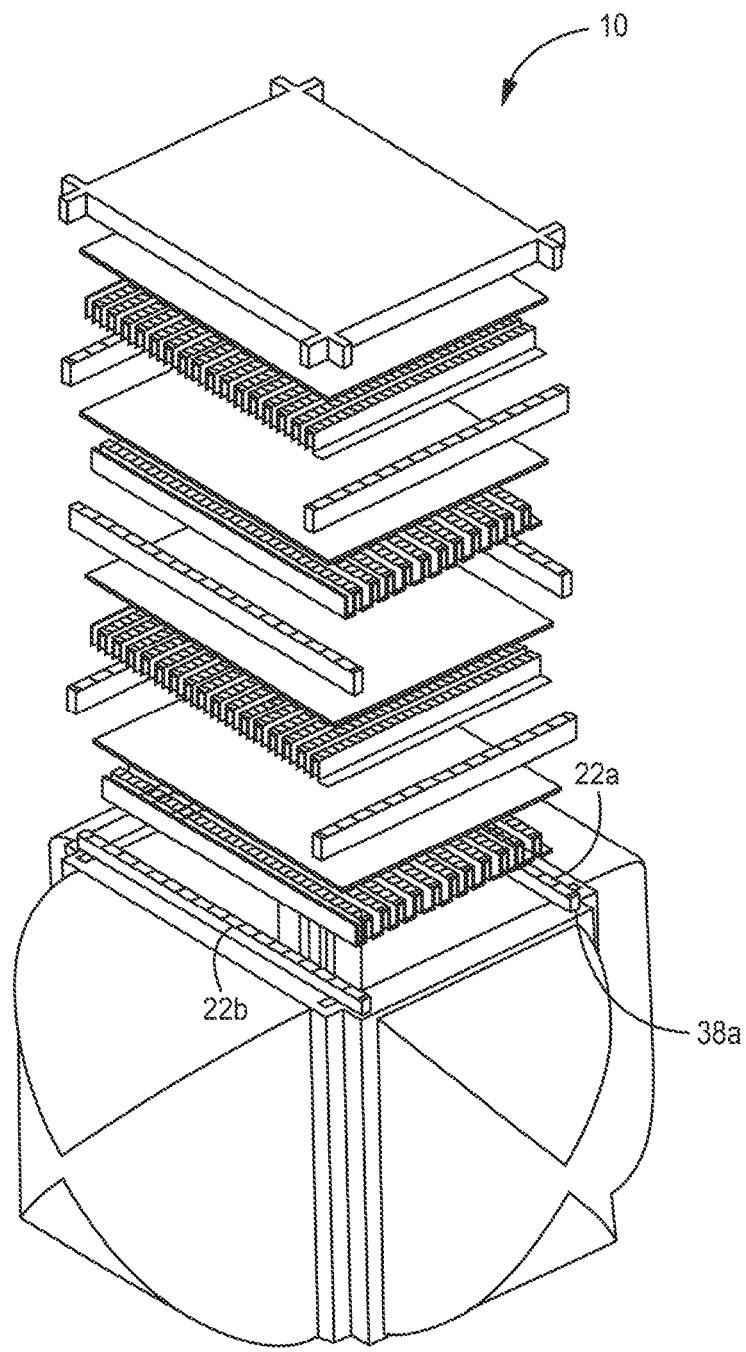
Figure 2C:
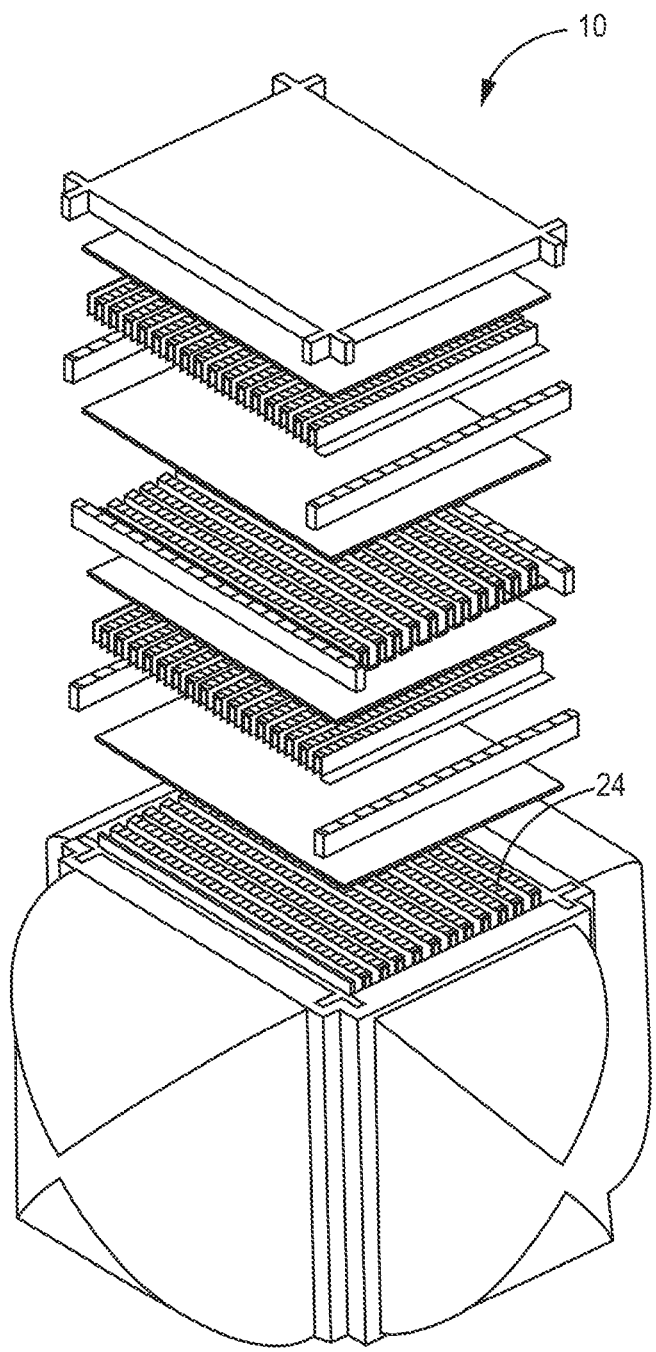
Figure 2D:
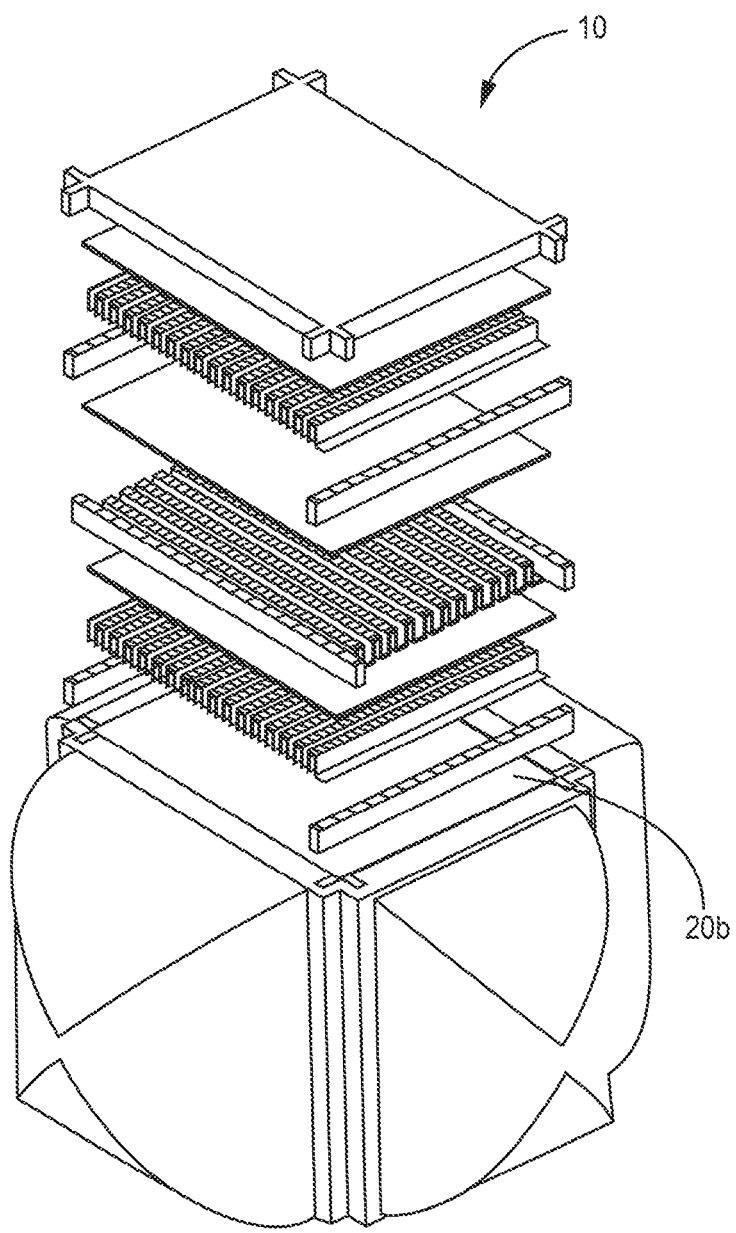
Figure 2E:
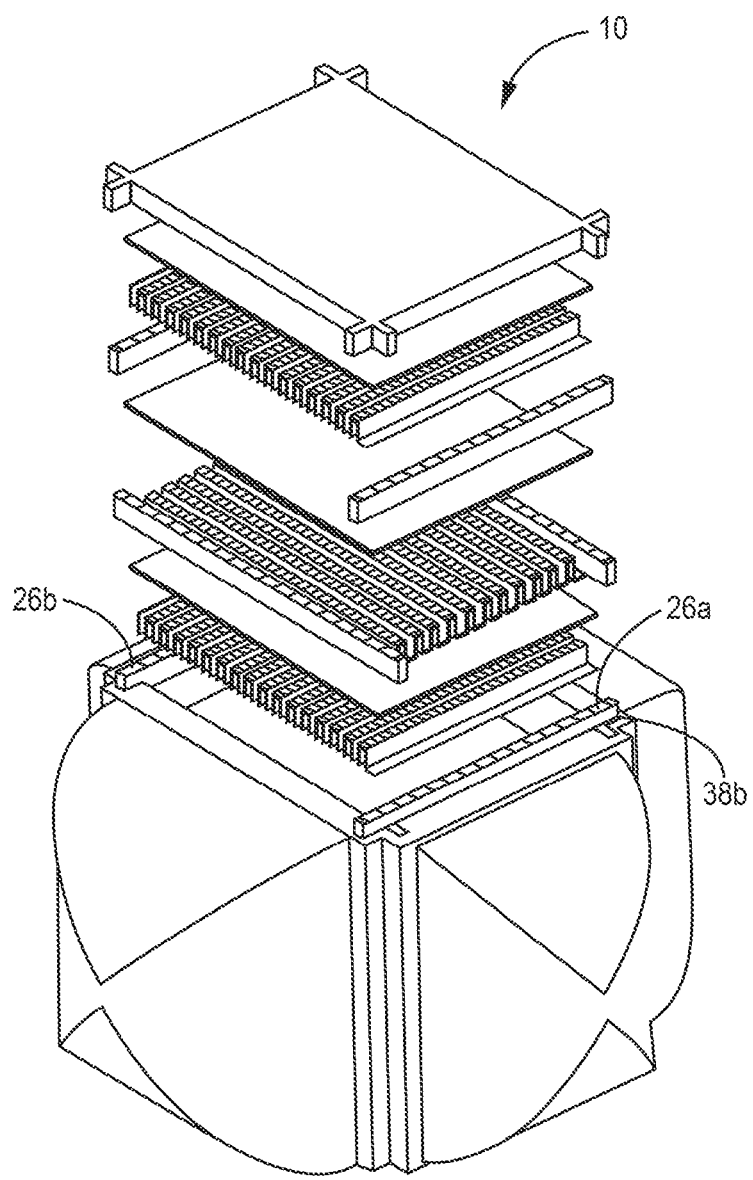
Figure 2F:
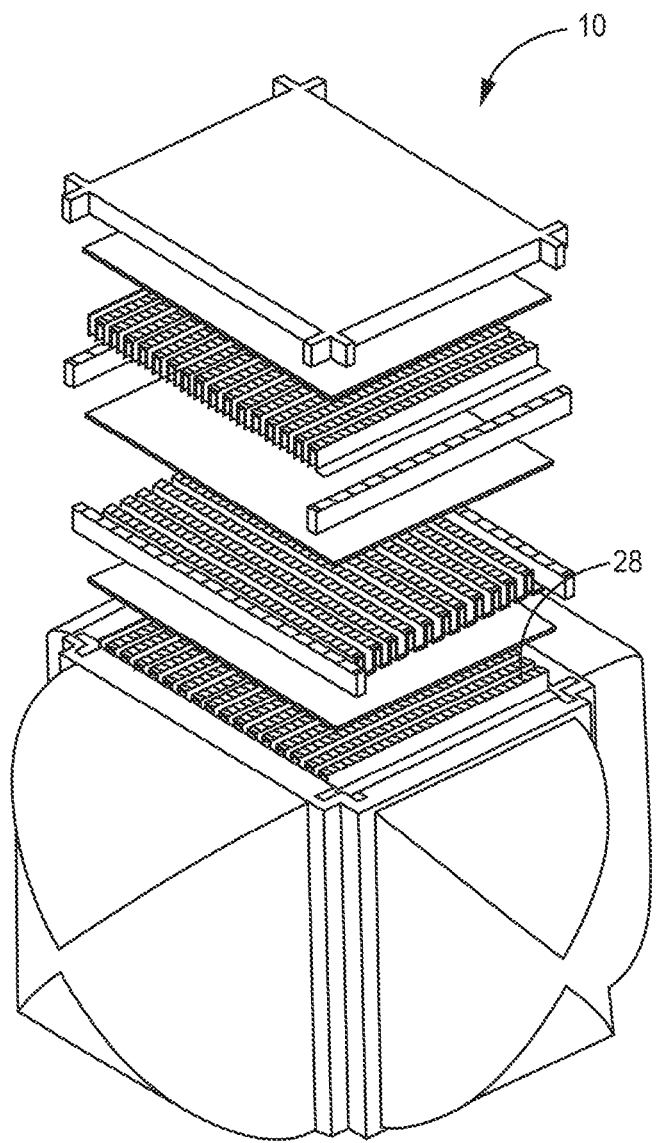
Figure 2G:
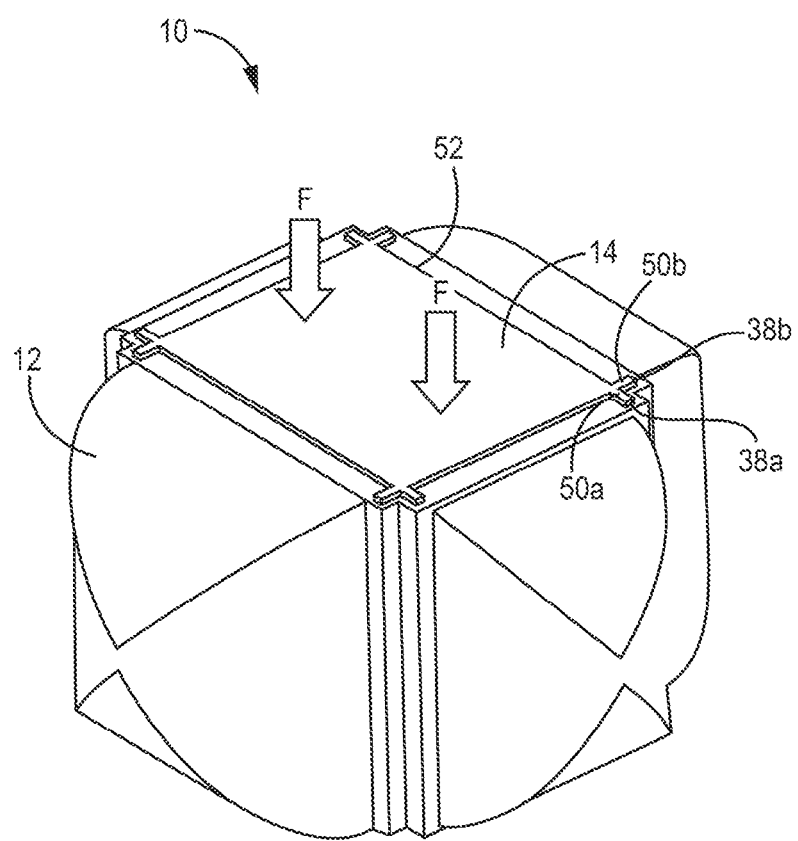
Figure 3:
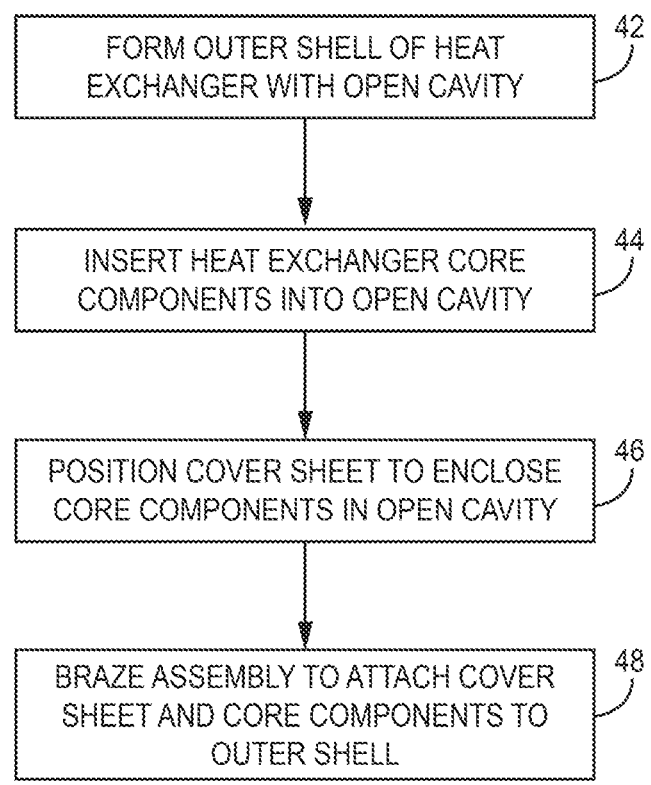
FIG. 3 is a flow diagram illustrating an example technique for assembling the plate fin heat exchanger of FIG. 1.

FIGS. 2A-2G are conceptual diagrams illustrating a process for assembling the plate fin heat exchanger of FIG. 1, such as, e.g., the example process illustrated by the flow diagram of FIG. 3. Although the example technique of FIG. 3 is described as being employed to make heat exchanger assembly 10 of FIG. 1, the example process of FIG. 3 may be employed to form any suitable heat exchanger assembly.

As shown in FIG. 3, outer shell 12 defining open cavity 18 may be formed using any suitable fabrication technique (42). In some examples, outer shell 12 may be formed prior to the insertion of core components 16 within cavity 18, e.g., rather than welding pieces of an outer shell together around a preformed stack of core components 16. In some cases, outer shell 12 may be formed of multiple pieces that are welded or otherwise attached to each other prior to assembly of core components 16 within cavity 18 or, alternatively, outer shell 12 may be formed of a unitary structure (e.g., a single monolithic piece defining cavity 18). In the example of FIG. 1, outer shell 12 may be define open cavity 18 in which five of the six sides of the generally cube shaped cavity (having a rectangular cross-section) are bounded or otherwise defined by outer shell 12. As will be described further below, the aperture 39 in outer shell 12 that allows access to open cavity 18 may be subsequently covered by a separate cover that is attached to outer shell 12 to close cavity 18 once core components 16 have been inserted (e.g., stacked) within cavity 18.

In some examples, one or more additive manufacturing techniques may be employed to form outer shell 12 including those techniques referred to as 3D printing (42). Suitable additive manufacturing techniques that may be employed to form outer shell 12 include selective laser melting (SLM) or electron beam melting (EBM) although other additive manufacturing technique are contemplated. Additionally or alternatively, all or a portion of outer shell 12 may be formed by a metal casting process or machining process.

Outer shell 12 may be formed of any suitable material. In some examples, outer shell 12 may be formed of aluminum or aluminum alloy although other materials are contemplated. For example, depending on temperature and pressure requirements, outer shell 12 (as well as other components of heat exchanger 10 such as the fins, enclosure bars, and tube sheets) may be made of stainless steel, nickel alloy (e.g., Inconel), and/or titanium.

Once outer shell 12 has been formed (42), core components 16 of heat exchanger 10 may be inserted into open cavity 18 defined by outer shell 12 (44). Core components 16 may be inserted individually on a piece-by-piece basis or by inserting multiple individual components of core components 16 at the same time. The use of open cavity 18 to assemble core components 16 may eliminate the use of a separate fixture to assemble core components 16 of heat exchanger 10. FIG. 2A shows tube sheet 20a of core components 16 being inserted into the top portion of open cavity 18 through aperture 39. Tube sheet 20a may then be slid further into open cavity 18 (e.g., to the bottom of open cavity 18, the surface furthest from aperture 39 to allow space for the additional components of core components 16. Tube sheet 20a is sized such that its outer perimeter is adjacent to inner walls 40 of open cavity 18. In the example of FIG. 2A, tube sheet 20a does not slide within alignment grooves 38a and 38b or the other alignment grooves but instead is guided by inner wall 40 outside the ends of the alignment grooves 38a and 38b. In other examples, tube sheet 20a may include one or more protrusions which extend into a respective groove, such as groove 38a and/or 38b, to aid in aligning or other guiding tube sheet 20a into open cavity 18 and well as retention of tube sheet 20a in place during operation of heat exchanger 10.

As shown in FIG. 2B, following the insertion of tube sheet 20a into cavity 18, cold enclosure bars 22a and 22b of core components 16 may be inserted into cavity 18 and slid down on top of tube sheet 20a to stack on tube sheet 20a near the bottom of cavity 18. In some examples, each end of cold enclosure bars 22a and 22b may be inserted into an alignment groove, e.g., alignment groove 38a, when being inserted and slid into cavity 18 so that cold enclosure bars 22a and 22b are aligned as desired to form cold passageway 30 when core components 16 is fully stacked within cavity 18. Additionally, as described further below, the edges of cold enclosure bars 22a and 22b that extend within respective alignment grooves may be attached within the respective alignment grooves via braze joint(s) to increase the strength of the attachment of cold enclosure bars 22a and 22b within the stack of core components 16 within cavity 18 and attachment to outer shell 12. The alignment grooves may aid in retention of cold enclosure bars 22a and 22b within open cavity 18 during operation of heat exchanger 10.

As shown in FIG. 2C, cold fins 24 of core components 16 may be inserted into cavity 18 and dropped between cold enclosure bars 22a and 22b that were previously placed on top of tube sheet 20a. As shown in FIG. 2D, second tube sheet 20b of core components 16 is then placed and slid into cavity 18 to be positioned on top of cold enclosure bars 22a and 22b and cold fins 24. As with tube sheet 20a, in some examples, tube sheet 20b does not slid within alignment grooves 38a and 38b or the other alignment grooves but instead is guided by inner wall 40 outside the ends of the alignment grooves 38a and 38b. In other examples, tube sheet 20b may include one or more tabs which extend into a respective groove, such as groove 38a and/or 38b, to aid in aligning or other guiding tube sheet 20a into open cavity 18.

As shown in FIG. 2E, following the insertion of tube sheet 20b into cavity 18, hot enclosure bars 26a and 26b of core components 16 may be inserted into cavity 18 and slid down on top of tube sheet 20b to stack on tube sheet 20b. Each end of hot enclosure bars 26a and 26b may be inserted into an alignment groove, e.g., alignment groove 38b, when being inserted and slid into cavity 18 so that hot enclosure bars 26a and 26b are aligned as desired to form hot passageway 32 when core components 16 is fully stacked within cavity 18. Additionally, as described further below, the edges of hot enclosure bars 26a and 26b that extend within respective alignment grooves may be attached within the respective alignment grooves via braze joint(s) to increase the strength of the attachment of hot enclosure bars 26a and 26b within the stack of core components 16 within cavity 18 and attachment to outer shell 12. The alignment grooves may aid in retention of hot enclosure bars 26a and 26b within open cavity 18 during operation of heat exchanger 10.

As shown in FIG. 2F, hot fins 28 may then be inserted into cavity 18 and dropped between hot enclosure bars 26a and 26b that were previously placed on top of tube sheet 20b.

The process of alternating hot and cold passageway components separated by one or more tube sheets may be continued until, e.g., the stack of hot and cold components reaches a desired height within cavity 18 and/or defines a desired amount of respective hot and cold passageways within outer shell 12. In some examples, a tube sheet is the last individual component of core components 16 stacked within cavity. The top and bottom sheets of the core component stack may be referred to as side sheets. In some heat exchanger designs, these top and bottom tube sheets are the same as all of the rest of the "intermediate" tube sheets. The bottom of outer shell 12 that the bottom tube sheet rests on and cover 14 may be the structural members. For a stacked heat exchanger, a bottom side plate considerably thicker than the tube sheet may be first stacked, then followed by a bottom tube sheet and then the fin and enclosure bar layer stack. At the top of the stack, a final top tube sheet may be used followed by a top side plate. In such a design, the tube sheet above the bottom side plate and below the top side plate do not divide any components but are included to supply the braze filler material (e.g., braze alloy) to join the side plates to the bars and fins when the braze filler material is coated on the surface of the tube sheet.

Once core components 16 have been inserted and stacked within cavity 18 of outer shell 12 (44), e.g., following the placement of a final tube sheet, cover 14 may be placed over aperture 39 defining the opening into cavity 18 of outer shell 12 in position to enclose core components 16 within open cavity 18 of outer shell 12 and then attached to outer shell 12 (46). As shown in FIG. 2G, cover 14 may mate with the alignment features, e.g., groove 38a and/or groove 38b, defined by outer shell 12 to assist in positioning cover 14 in the desired alignment. In the example of FIG. 2G, cover 14 includes a plurality of protrusions, such as protrusions 50a and 50b, which each mate with a respective groove in outer shell (e.g., grooves 38a and 38b) to align cover 14 over the opening of cavity 18.

When cover 14 is positioned to enclose open cavity 18 containing core components 16, cover 14 may be attached to outer shell 12 via brazing (48). For example, a braze filler material, such as the example filler materials described above, may be deposited along all or a portion of outer perimeter 52 of cover 14 prior and/or while cover 14 is positioned over the opening of cavity 18. Cover 14 and outer shell 12 (with core components 16 within open cavity 18) may be heated, e.g., within an oven, so that the filler material melts. The assembly may then be cooled to solidify the melted filler material to form a braze joint between cover 14 and outer shell 12 (48). In some examples, a compressive force may be applied (represented by arrows F in FIG. 2G) to the top surface of cover 14 in the direction of open cavity 18 during the heating. An external fixture may be used during the brazing process to apply the compressive force F to cover 14. The compressive force F may be applied to press each of the layers into intimate contact with the details on either side. The fins are made of very thin material and may be slightly taller than the adjacent enclosure bars within a layer. When the pressure is applied the fins may deform a little and the tube sheets are pressed down firmly against the top and bottom of the bars. Once the heat is applied to form braze joints between each of these parts, the bars and fins are completely brazed to the adjacent tube sheet(s).

As noted above, a braze filler material may also be applied to various locations on core components 16 when the individual components (e.g., hot and cold enclosure bars, fins, and/or tube plates) are inserted and assembled within cavity 18. Such filler material may be used to form braze joints between individual components of core components 16 and/or between core components 16 and inner wall 40 of open cavity 18. In some examples, the heating of the filler material to form a braze joint between cover 14 and outer shell 12 (48) may also melt the filler material deposited between individual components of core components 16 and/or between core components 16 and inner wall 40 of open cavity 18 such that, upon cooling, braze joints are also formed to attach the individual components of core components 16 to each other and/or core components 16 to inner wall 40. Alternatively, the braze joints that attach the individual components of core components 16 to each other and/or core components 16 to inner wall 40 may be formed via a heating step prior to attachment of cover 14 to outer shell 12.

The braze filler material that forms the braze joints between the individual components of core components 16 and/or between core components 16 and inner wall 40 of open cavity 18 may be deposited, e.g., during the assembly of core components 16 within open cavity 18. Once the brazing process is complete, the enclosure bars are brazed to the adjacent top and bottom tube sheets along the entire length of the enclosure bars (or at least the length of the enclosure bar that forms an interface with the adjacent tube sheets. Furthermore, the tube sheets may be brazed to the adjacent fins of the hot and cold layers (e.g., by forming a braze joint at the peaks and valleys of the fins with the adjacent surface of opposing tube sheets). In some examples, braze joints may be formed between the vertical walls of the enclosure bars and adjacent portions of inner wall 40 of open cavity 18.

In some examples, when core components 16 are fully assembled within open cavity 18, braze filler material may be located at the interface between the respective tube sheets and the adjacent hot and cold enclosure bars within the stack of core components. Braze filler material may also be located between the vertical walls of the enclosure bars and adjacent portions of inner wall 40 of open cavity 18. The braze filler material (e.g., braze alloy) may be applied in different ways including when the individual components are created and/or during assembly of the components within open cavity 18. In some examples, the braze filler material may be clad to both sides of individual tube sheets and to the vertical sides of the hot and cold bars. This may be done with large sheets that which include the braze filler material that are then cut to the size needed for the brazed tube sheets and enclosure bars. The large sheets may be formed by laying a braze filler material sheet (e.g., that is 0.001 to 0.002 inches thick) on each side of a base material sheet, which is then rolled back and forth over it to compress the filler material to the base material sheet. In one example, 0.001 inch thick braze material sheet, then a 0.010 inch thick sheet of the heat exchanger base material and then another 0.001 inch thick braze material sheet may be stacked. This may also be done by placing three such sheets together while stacking the core components 16. The braze filler material may also take the form of separate, relatively thin sheets (e.g., 0.001 to 0.002 inches thick) that would be placed adjacent to the tube sheets and enclosure bars in the areas in which braze joints are desired. Alternatively, or additionally, the braze filler material may be applied on the tube sheets and vertical sides of the enclosure bars, e.g., via brushing, spraying or rolling on the desired surface. Any suitable braze filler material may be used. For example, the braze filler material may include a metal that has a melting point below the melting point of the heat exchanger base material (e.g., the metal material of the fins, enclosure bars, tubes sheets, and outer shell). In some examples, a high temperature glue or other suitable adhesive may be used to adhere the individual components together as described herein in place of the described braze joints.

In some examples, the brazing process used to attach cover 14 to outer shell 12 and/or core components 16 to each other may include heating cover 14, outer shell 12, and core components 16 in an oven. The oven may raise the temperature of the braze filler material deposited at various locations in the assembly to at or above the liquidus (melting) temperature of the braze filler material, and the temperature may be held until the entire part reaches the temperature. Upon cooling, the melted braze filler material may solidify to attach opposing surfaces of cover 14, core components 16, and/or outer shell 12 to each other via braze joints.

By employing a brazing process to attach cover 14 to outer shell 12 rather than, e.g., a welding process, the attachment process does not interfere with any braze joints attaching core components 16 to each other and/or inner wall 40 formed prior to the attachment of the cover 14 to outer shell 12. For example, a welding process to attach cover 14 to outer shell 12 may increase the temperature of existing braze joints above the melting point of the filler material, which may increase the potential for fluid leaks within the flow passageways of core components 16 (e.g., cold passageway 30 and hot passageway 32). Similarly, using a preformed outer shell 12 as a fixture for assembling core components 16 may provide similar benefits, e.g., by avoiding the welding of multiples pans to each other to form an outer housing around a pre-brazed assembly of core components 16. By forming the braze joints attaching core components 16 to each other and/or inner wall 40 during the brazing process used to attach cover 14 to outer shell 12 via braze joint(s), a more efficient process may be achieved compared to a technique in which the various braze joints are formed using separate brazing processes (e.g., separate instances of heating the braze filler material in an oven). In some examples, no welding of heat exchanger 10 may be carried out once the braze joints that attach cover 14 to outer shell 12, core components 16 to each other, and/or core components 16 to outer shell 12 have been formed, e.g., to avoid interfering with the already formed braze joints with the high temperature welding process, as described herein.

In some examples, the example technique of FIG. 3 may be employed to build heat exchanger 10 by additive manufacturing (e.g., 3D printing) outer shell 12 as one piece with the external features as close to the final desired configuration as possible (42). A final machining step may be employed to bring the external surfaces of the additive manufactured outer shell 12 to the desired size. In the additive manufacturing examples, the internal features, e.g., alignment features for locating the individual core details, may also be formed by additive manufacturing. However, the internal features may not need to be machined. Core components 16 may then be stacked as required inside cavity 18 of outer shell 12 (44). Cover 14 may then be placed on top of outer shell 12 to cover open cavity 18 (46) and a fairly simple fixture may then be employed to apply pressure to cover 14 and stacked core components 16 during the oven brazing process (48).

Figure 4B:
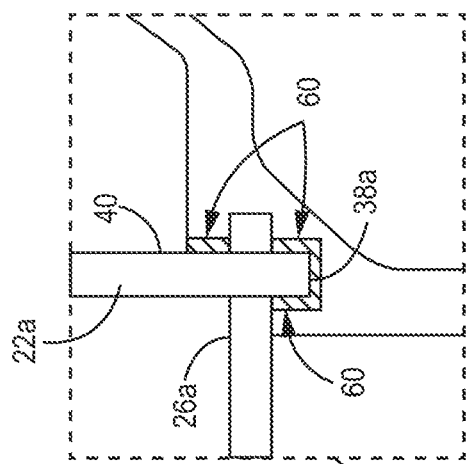
FIGS. 4B and 4C are conceptual diagrams illustrating a magnified view of the alignment features shown in FIG. 4.
Figure 4C:
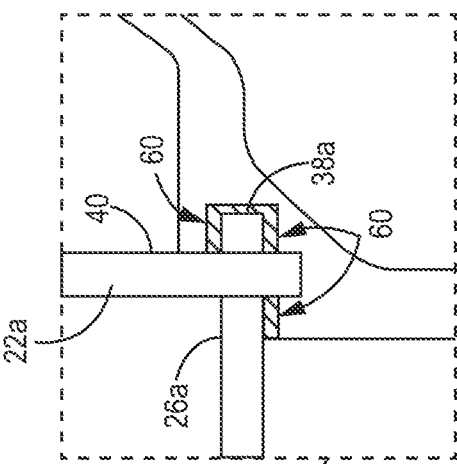
Figure 4A:
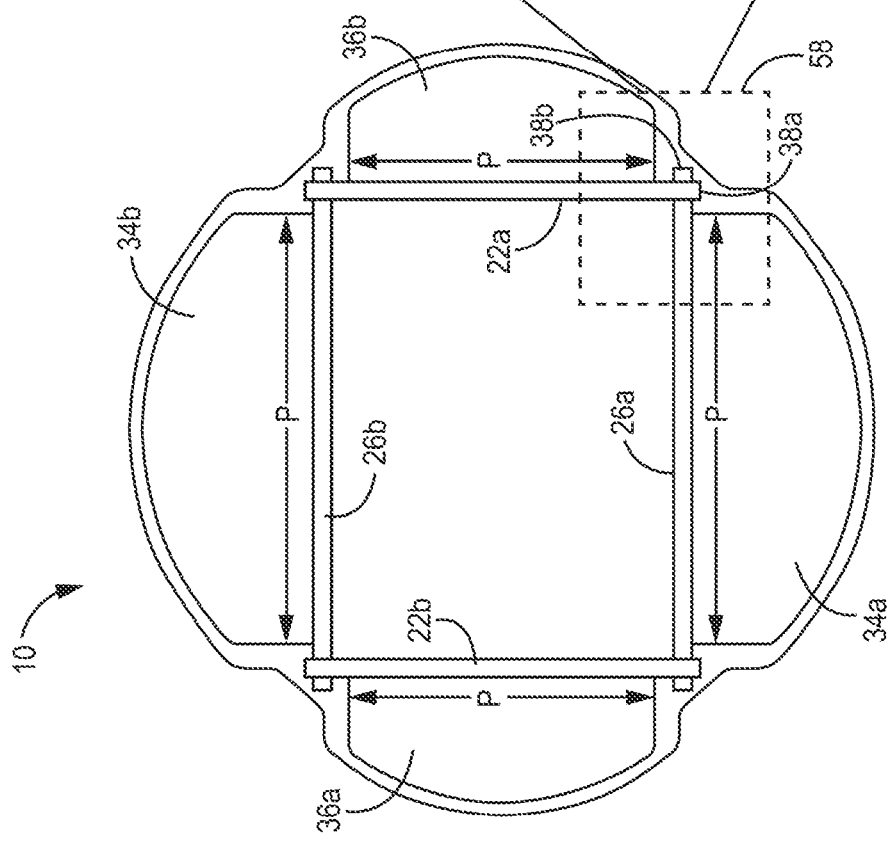
FIG. 4A is a conceptual diagram illustrating an internal view of the example plate fin heat exchanger of FIG. 1.

FIG. 4A is a conceptual diagram illustrating an internal view of the plate fin heat exchanger 10 of FIG. 1. For purposes of illustration, cold bars 22a and 22b are shown in FIG. 4A not being separated from hot bars 26a and 26b by tube sheet 20b. FIG. 4A illustrates the inside of cold intake manifold 34a, cold outlet manifold 34b, hot intake manifold 36a, and hot outlet manifold 36b through which fluid may flow into and out of during the operation of heat exchanger 10 as described above.

As shown in FIG. 4A, during operation of heat exchanger 10, a force may be caused (represented by arrows P) by pressuring heat exchanger 10 within fluid low pathways during use. The pressure force, P, may be reacted by the strength of outer shell 12 wanting to retain its shape and also by the tensile strength of the enclosure bars (e.g., bars 22a, 22b, 26a, and 26b) and the braze joints formed at the corners between the enclosure bars and outer shell 12, e.g., braze joints 60 shown in FIGS. 4B and 4C describes below.

As previously described, core components 16 may be attached to inner walls 40 of open cavity 18, e.g., via braze joints. For example, braze joints may be formed between each of the cold enclosure bars 22a, 22b and adjacent portions of inner wall 40 as well as between each of the hot enclosure bars 26a, 26b and adjacent portions of inner wall 40. However, in some examples, at higher operating pressures, braze joints formed in such a manner may not be sufficient to carry the necessary load while maintaining the desired degree of attachment between the hot/cold enclosure bars and inner wall 40 of cavity 18. In some examples, the individual hot and cold enclosure bars may be attached to outer shell 12 via braze joint(s) located at the alignment features formed in inner wall 40 of outer shell 12, e.g., to increase the strength of attachment of core components 16 to outer shell 12. In such examples, the relative amount of surface area of the braze joint between the individual hot and cold enclosure bars and inner wall 40 may be increased. Additionally, or alternatively, in some examples, the alignment features formed in inner wall 40 may mate with the individual hot and cold enclosure bars in a manner that provides a positive lock or other mechanical lock between the inner wall and individual bars, e.g., as shown in FIGS. 5A-5C below.

FIGS. 4B and 4C are conceptual diagrams illustrating a magnified view of window 58 of FIG. 4A showing cold enclosure bar 22a within alignment groove 38a and hot enclosure bar 26a within alignment groove 38b. As shown in FIG. 4B, braze joints 60 may be formed between outer shell 12 and cold enclosure bar 22a within groove 38a. Similarly, as shown in FIG. 4C, braze joints 60 may be formed between outer shell 12 and hot enclosure bar 26a within groove 38b. Although the braze joints are shown only for the magnified corner in FIGS. 4B and 4C, the other corners of cavity 18 of outer shell with the same or similar alignment grooves may also be attached to the respective hot and cold enclosure located within the grooves via braze joint(s) as well. Braze joints 60 may be formed by depositing a braze filler material (e.g., when cold bar 22a and hot bar 26a are inserted into open cavity 18), and then melting and cooling the material to form braze joints 60. As described herein, the melting and cooling process to form such braze joints may be carried out with the same heating process used to attach cover 14 to outer shell 12 via braze joints, or may be carried out as a brazing process separate from the attachment of cover 14 to outer shell 12.

In some examples, the braze filler material that forms braze joints 60 may be integral with the enclosure bars (e.g., cold bar 22a and hot bar 26a), e.g., meaning that, when the raw material for each part is created, the part includes a thin layer of braze filler material on either side of the heat exchanger base material. In some examples, a braze filler material may be applied in the form of a paste or separate foil strips after the components are formed, e.g., on either or both mating surfaces between which the braze joints are formed.

FIGS. 5A-5C are conceptual diagrams illustrating additional example alignment feature configurations, e.g., for heat exchanger 10 of FIG. 1. FIGS. 5A-5C are magnified views of window 58 of FIG. 4A. However, FIGS. 5A-5C show alternative arrangements between cold enclosure bar 22a within groove 38a and hot enclosure bar 26a within groove 38b. In addition to or as an alternative to forming braze joint(s) 60 within grooves 38a and 38b, grooves 38a and 38b may be configured to form interlocking joints with cold enclosure bar 22a and hot enclosure bar 26a, respectively, when cold enclosure bar 22a and hot enclosure bar 26a are inserted into the respective grooves. Such joints may assist in the retention of the cold enclosure bar 22a and hot enclosure bar 26a within the respective alignment grooves, and increase the load carrying capability of the enclosure bars.

FIG. 5A shows example alignment grooves 38a and 38b as square load bearing retention/alignment grooves that mate with cold enclosure bar 22a and hot enclosure bars 26a, respectively, in a manner that provides a positive lock between the bars 22a, 26a and alignment grooves 38a, 38b, respectively.

FIG. 5B shows example alignment grooves 38a and 38b as round load bearing retention/alignment grooves that mate with cold enclosure bar 22a and hot enclosure bars 26a, respectively, in a manner that provides a positive lock between the bars 22a, 26a and alignment grooves 38a, 38b, respectively.

FIG. 5C shows example alignment grooves 38a and 38b as triangular load bearing retention/alignment grooves that mate with cold enclosure bar 22a and hot enclosure bars 26a, respectively, in a manner that provides a positive lock between the bars 22a, 26a and alignment grooves 38a, 38b, respectively.

Although square, round, and triangular retention grooves configurations are shown in FIGS. 5A-5C, other configurations that provide for an interlock or positive lock between an enclosure bar and alignment groove are contemplated and can be used with the heat exchangers described herein.

Figure 14A:
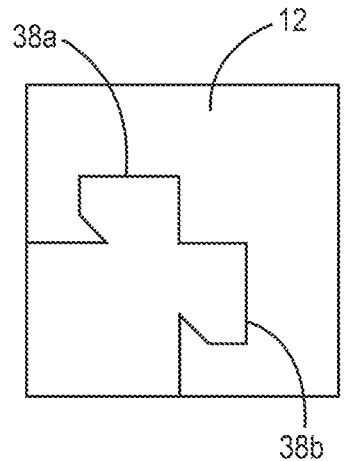
FIGS. 14A-15C are conceptual diagrams illustrating example alignment feature configurations.
Figure 14B:
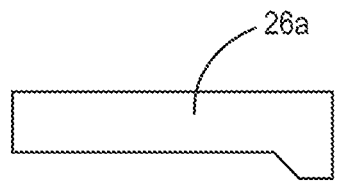
Figure 14C:
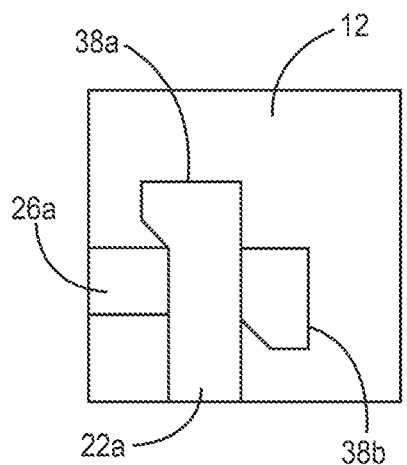

FIGS. 14A-14C are conceptual diagrams illustrating additional example alignment feature configurations, e.g., for heat exchanger 10 of FIG. 1, and are magnified view similar to that shown in FIGS. 5A-5C. Like FIGS. 5A-5C, the examples shown in FIGS. 14A-14C are alternative arrangements between cold enclosure bar 22a within groove 38a and hot enclosure bar 26a within groove 38b. Grooves 38a and 38b may be configured to form interlocking joints with cold enclosure bar 22a and hot enclosure bar 26a, respectively, when cold enclosure bar 22a and hot enclosure bar 26a are inserted into the respective grooves. Such joints may assist in the retention of the cold enclosure bar 22a and hot enclosure bar 26a within the respective alignment grooves, and increase the load carrying capability of the enclosure bars.

FIG. 14A is a magnified view of outer shell 12 showing grooves 38a and 38b without enclosures bars mated with the grooves. FIG. 14B illustrates the end of hot enclosure bar 26a configured to mate with groove 38b formed in outer shell 12. FIG. 14C illustrates outer shell 12 with the end of hot enclosure bar 26a mated and located within groove 38b, and the end of cold enclosure bar 22a mated and located within groove 38a.

Figure 15A:
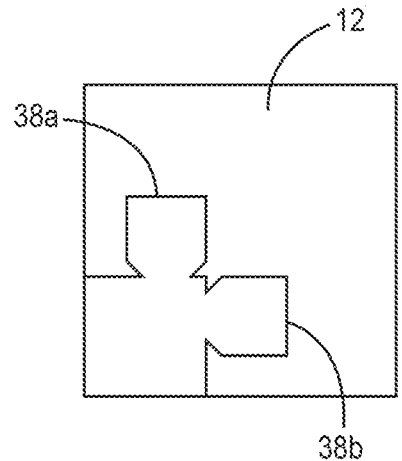
Figure 15B:
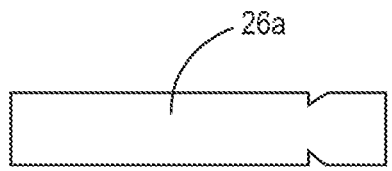
Figure 15C:
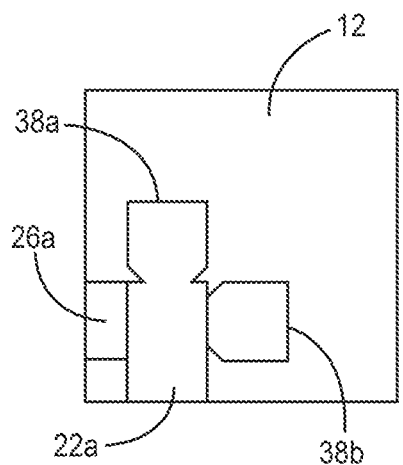

FIGS. 15A-15C are conceptual diagrams illustrating additional example alignment feature configurations, e.g., for heat exchanger 10 of FIG. 1, and are magnified view similar to that shown in FIGS. 14A-14C. Like FIGS. 5A-5C, the examples shown in FIGS. 14A-14C are alternative arrangements between cold enclosure bar 22a within groove 38a and hot enclosure bar 26a within groove 38b. Grooves 38a and 38b may be configured to form interlocking joints with cold enclosure bar 22a and hot enclosure bar 26a, respectively, when cold enclosure bar 22a and hot enclosure bar 26a are inserted into the respective grooves. Such joints may assist in the retention of the cold enclosure bar 22a and hot enclosure bar 26a within the respective alignment grooves, and increase the load carrying capability of the enclosure bars.

FIG. 15A is a magnified view of outer shell 12 showing grooves 38a and 38b without enclosures bars mated with the grooves. FIG. 15B illustrates the end of hot enclosure bar 26a configured to mate with groove 38b formed in outer shell 12. FIG. 15C illustrates outer shell 12 with the end of hot enclosure bar 26a mated and located within groove 38b, and the end of cold enclosure bar 22a mated and located within groove 38a.

Figure 6C:
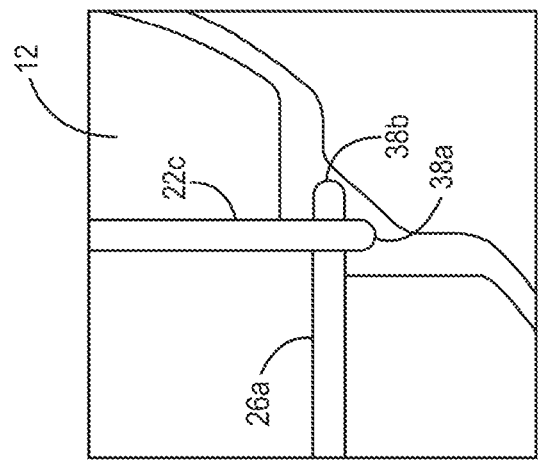
FIGS. 6A-6C are conceptual diagrams illustrating example alignment feature configurations.
Figure 6B:
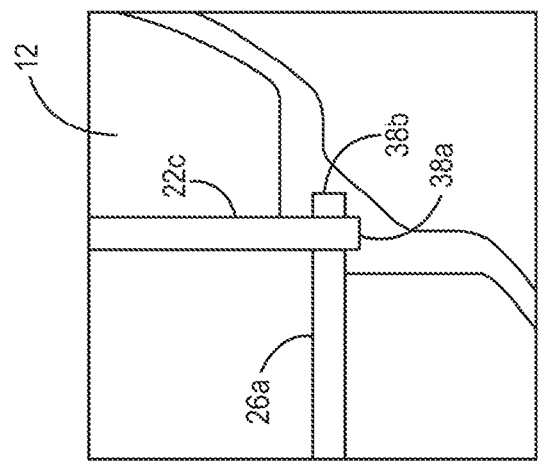
Figure 6A:
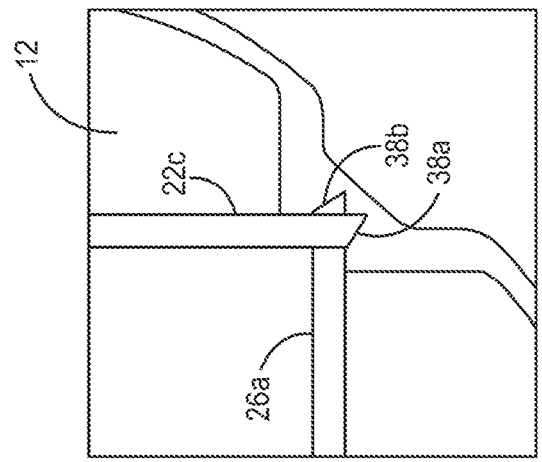

FIGS. 6A-6C are conceptual diagrams illustrating example alignment feature configurations, e.g., for heat exchanger 10 of FIG. 1. For example, FIG. 6A illustrates an example in which grooves 38a and 38b are wedge grooves. FIG. 6B illustrates an example in which grooves 38a and 38b are square grooves. FIG. 6C illustrates an example in which grooves 38a and 38b are curved or rounded grooves. The hot and cold enclosure bars may have shapes corresponding to the shape of the respective grooves to allow for the bars to mate with the grooves. Other geometries for grooves 38a and 38b, as well as the other grooves formed in inner wall 40 of cavity 18 are contemplated.

Figure 7:
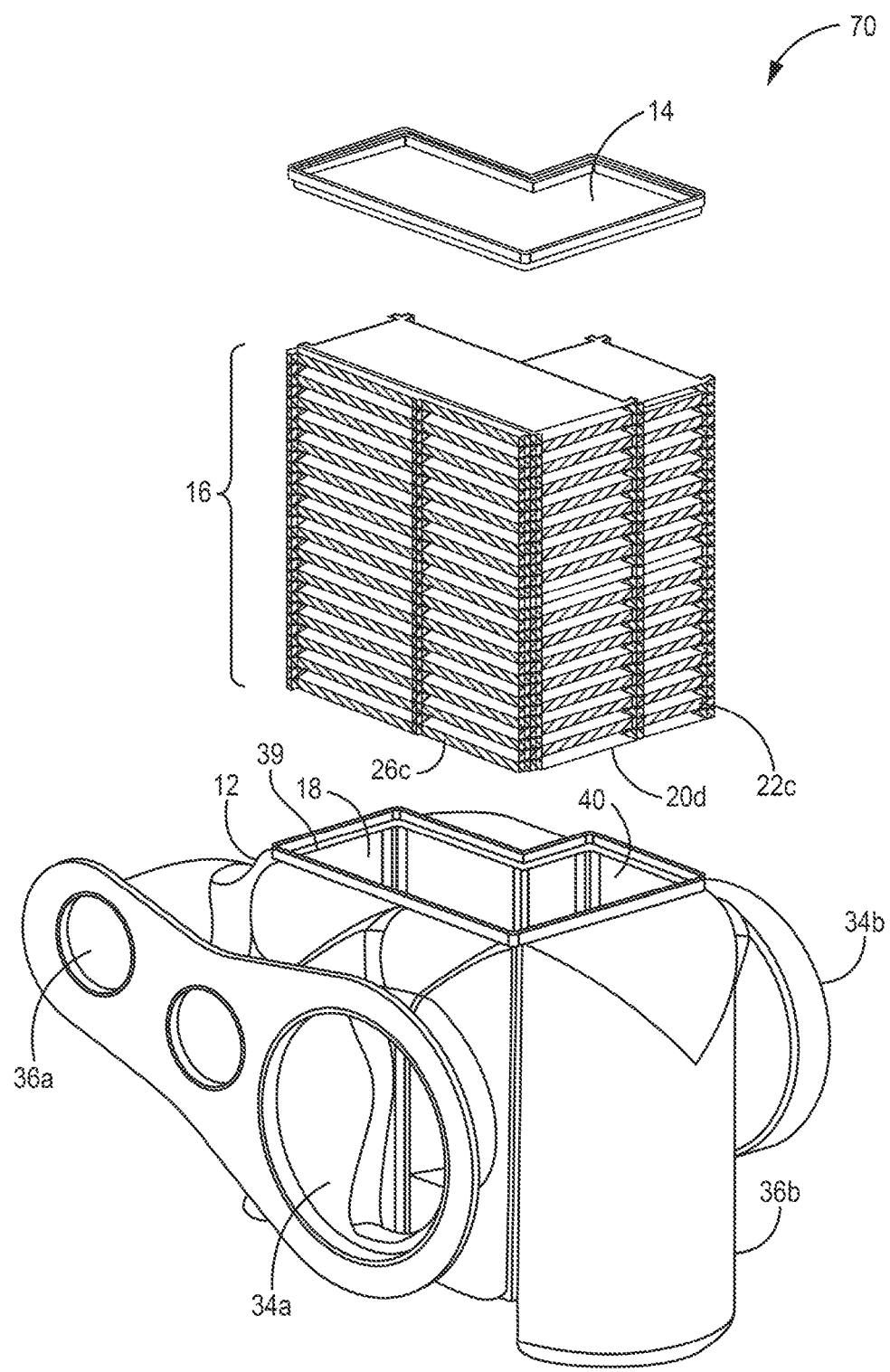
FIG. 7 is a conceptual diagram illustrating an exploded view of another example plate fin heat exchanger.

FIG. 7 is a conceptual diagram illustrating an exploded view of another example plate fin heat exchanger 70. Plate fin heat exchanger 70 may be substantially similar to plate fin heat exchanger 10 of FIG. 1, except for some differences described below, and similar features are similarly numbered. Additionally, any suitable technique may be employed to make heat exchanger 70 including, e.g., the example technique of FIG. 3. For ease of illustrations, the hot and cold fins of respective hot and cold passageways in core components 16 are not shown. However, such fins may be employed, e.g., as described with regard to heat exchanger 10 of FIG. 1.

As shown in FIG. 7, heat exchanger 70 includes outer shell 12, cover 14, and core components 16. Outer shell 12 defines an open cavity 18 within which core components 16 may be stacked and subsequently enclosed by attaching cover 14 to outer shell 12, e.g., using an example technique in accordance with the disclosure. Core components 16 includes a plurality of tube sheets 20 (e.g., bottom tube sheet 20d) which separate alternating hot and cold layers of heat exchanger 10. Each cold passage layer of core components 16 includes cold enclosure bars 22 (e.g., individual cold bar 22c) and cold fins (not shown). Each hot passage layer of core components 16 includes hot enclosure bars 26 (e.g., individual hot bar 26c) and hot fins 28. Open cavity 18 of heat exchanger 70 defines an "L" shape in cross-section unlike the rectangular (e.g., square) cross-sectional shape of open cavity 18 of heat exchanger 10. Other open cavity shapes are contemplated.

Unlike the view shown in FIG. 1, core components 16 are shown in FIG. 7 as they would be inserted and stacked within open cavity 18 of outer shell 12 (e.g., rather than an exploded view in individual components are shown separated in FIG. 1). FIGS. 8A-8E are schematic diagrams illustrating a process for inserting core components 16 into open cavity 18, similar to that described for heat exchanger 10 within regard to the example technique of FIG. 3. The heat exchanger core may be assembled component by component, layer by layer inside open cavity 18 of outer shell 12 or within multiple layers being inserted at a time (e.g., as shown in FIGS. 8A-8E). As described below, respective components of core components 16 (e.g., hot enclosure bars, cold enclosure bars, and tube sheets) include aligning features (e.g., protrusions) that match with the corresponding alignment features (e.g., grooves) formed in inner surface 40 of outer shell 12. Such alignment features may assist in properly locating the respective components of core components 16 when being inserted and stacked within open cavity 18. The aligning features on outer shell 12 and core components 16 may reduce core fixturing and allow a consistent core braze assembly with minimal tooling.

Like that of heat exchanger 10, when assembling core components 16 are inserted and stacked within open cavity 18, the respective individual components of core components 16 may be attached via brazing in the manner described above with regard to FIG. 3. Braze joints may be formed between the individual components of core components 16 and/or between core components 16 and inner wall 40 of open cavity 18 by depositing suitable filler material at those positions as described above with regard to heat exchanger 10. The filler material may then be heated, e.g., by inserted core components 16 and outer shell 12 into an oven, to melt the filler material, which may form braze joints upon cooling. Like that described above, in some examples, the same brazing process used to attach core components 16 to each other and/or to inner wall 40 of cavity 18 may be used to attach cover 14 of heat exchanger 70 to outer shell 12 via brazing when cover 14 is positioned to enclose core components within cavity 18. For example, once core components 16 have been inserted and stacked within cavity 18 and cover 14 has been positioned to cover cavity 18, the entire assembly of outer shell 12, cover 14, and core components 16 may be heat together in an over to melt filler material that, upon cooling, form multiple braze joints that attach cover 14 to outer shell 12 and attach core components 16 together and/or to inner wall 40 of outer shell 12.

Figure 9B:
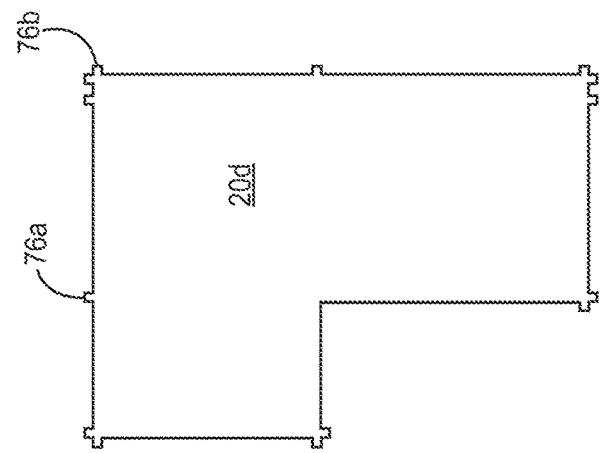
FIGS. 9A and 9B are conceptual diagrams illustrating a partially assembled and tube sheet of the plate fin heat exchanger of FIG. 7.
Figure 9A:
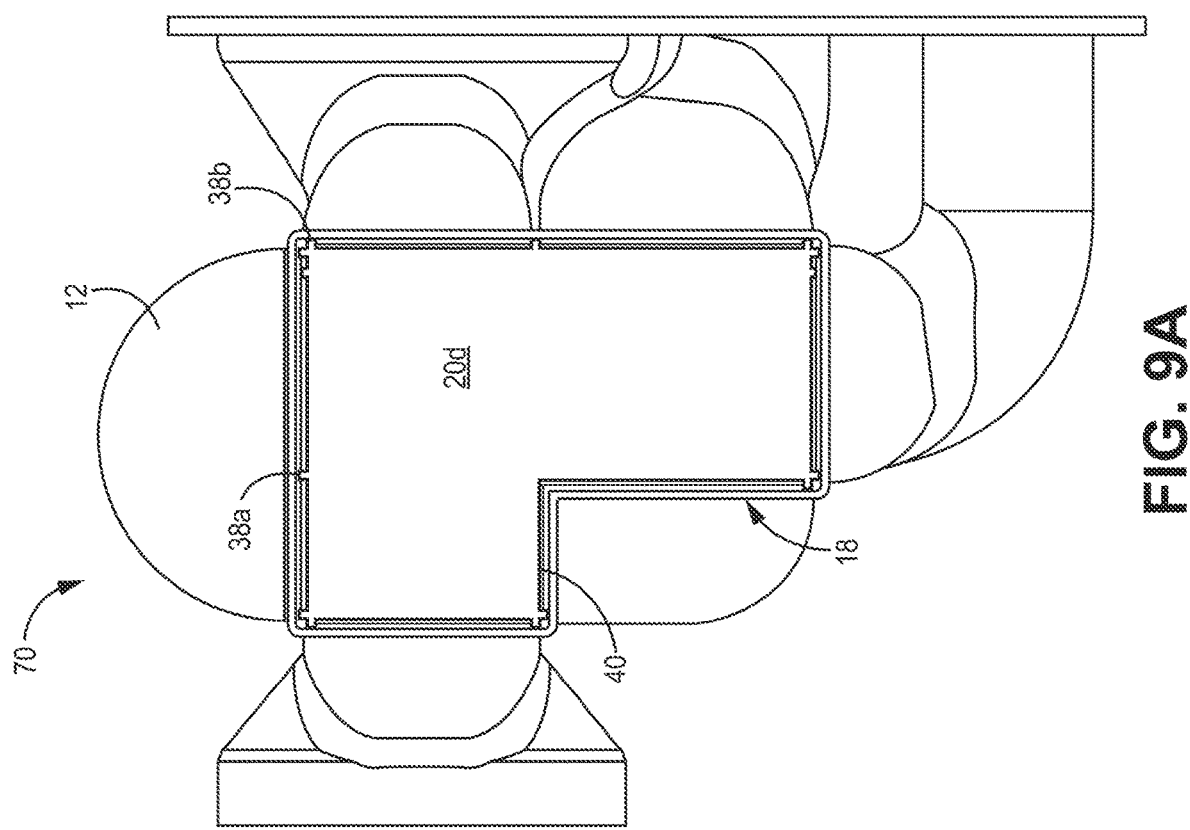

FIG. 9A is a conceptual diagram illustrating a plan view of tube sheet 20*a* within cavity 18 of outer shell 12, e.g., as the first sheet stacked within cavity 18. FIG. 9B illustrates a plan view of tube sheet 20*c* individually. As shown, inner wall 40 of open cavity 18 includes a plurality of alignment features in the form of grooves 38 into inner wall 40. For clarity, only alignment grooves 38*a* and 38*b* of the plurality of alignment grooves in inner wall 40 are labelled in FIG. 9A. Tube sheet 20*d* includes corresponding alignment features in the form of protrusions 76 (only protrusions 76*a* and 76*b* are labelled) which are configured to mate with the alignment features formed in inner wall 40. For example, as show in FIG. 9A, protrusions 76*a* and 76*b* extend into and mate within grooves 38*a* and 38*b*, respectively.

The mating alignment features of heat exchanger 70 are not limited to grooves formed in outer shell 12 and protrusions in tube sheet 20*d*. In some examples, inner wall 40 may include one or more protrusions that mate with corresponding grooves formed in tube sheet 20*d*. In some examples, inner wall 40 may include both grooves and protrusions that mate with corresponding grooves and protrusions of outer sheet 20*d*.

Figure 10B:
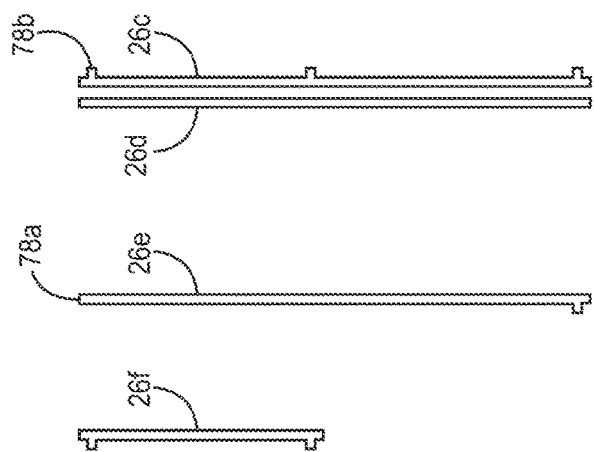
FIGS. 10A and 10B are conceptual diagrams illustrating a partially assembled and hot enclosure bars of the plate fin heat exchanger of FIG. 7.
Figure 10A:
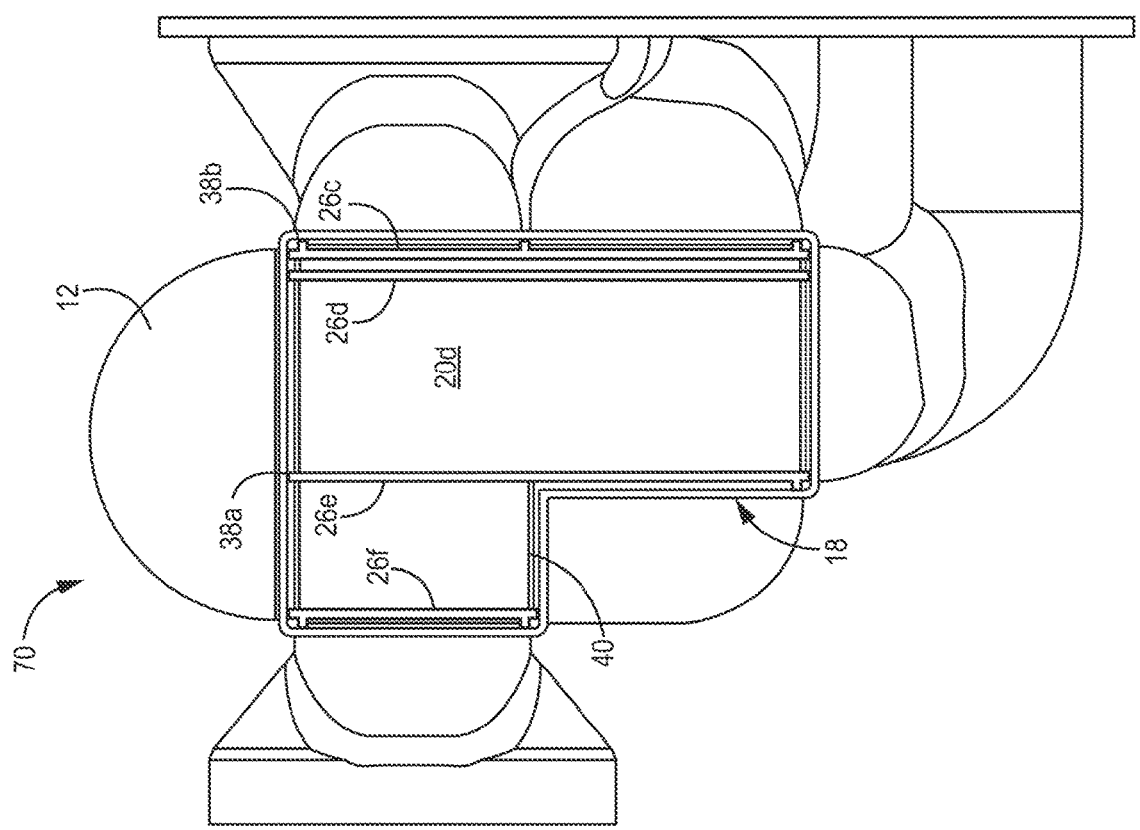

FIG. 10A is a conceptual diagram illustrating a plan view of hot enclosure bars 26*c*-26*f* positioned within cavity 18 of outer shell 12 on top of tube sheet 20*d*. FIG. 10B illustrates a plan view of hot enclosure bars 26*c*-26*f* individually. As shown, when hot enclosure bars 26*c*-26*f* are inserted and stacked within open cavity 18, portions of each of hot enclosure bars 26*c*-26*f* mate with respective alignment grooves 38 of outer shell 12. For example, as shown in FIG. 10A, end portion 78*a* of hot enclosure bar 26*e* mates with groove 38*a* of outer shell 12. Similarly, protrusion 78*b* of hot enclosure bar 26*c* mates with groove 38*b* of outer shell 12. Protrusion 78*b* may be located at the end or near the end of hot enclosure bar 26*c*. In the example of FIG. 10A, for each hot enclosure bars 26*c*-26*f*, both ends mate with a respective groove in cavity 18 of outer shell.

FIG. 11A is a conceptual diagram illustrating a plan view of cold enclosure bars 22*c*-22*e* positioned within cavity 18 of outer shell 12 on top of tube sheet 20*d*, which may be stacked on top of hot enclosure bars 26*c*-26*f* shown in FIG. 10A. FIG. 11B illustrates a plan view of cold enclosure bars 22*c*-22*e* individually. As shown, when cold enclosure bars 22*c*-22*e* are inserted and stacked within open cavity 18, portions of each of cold enclosure bars 22*c*-22*e* mate with respective alignment grooves 38 of outer shell 12. For example, as shown in FIG. 10A, end portion 80*b* of cold enclosure bar 22*c* mates with groove 38*b* of outer shell 12. Similarly, protrusion 80*a* of cold enclosure bar 22*c* mates with groove 38*a* of outer shell 12. In the example of FIG. 11A, for each cold enclosure bars 22*c*-22*e*, both ends mate with a respective groove in cavity 18 of outer shell.

FIGS. 12A and 12B are conceptual diagrams illustrating the positioning of cover 14 when attached to outer shell 12, e.g., as described in the example technique of FIG. 3. Once all core components 16 are inserted and stacked in cavity 18 (44), cover 14 may be positioned to enclose core components 16 within cavity 18 by covering the aperture 39 through which core components 16 were inserted into cavity 18 (46). To attach cover 14 to outer shell 12, a filler material may be deposited between outer perimeter 52 of cover 14 adjacent to outer shell 12. The filler material may then be melted, e.g., by heating outer shell 12 and cover 14 in an over, and then cooled to form a braze joint between outer shell 12 and cover 14 to attach cover 14 to outer shell 12. As shown in FIG. 12B, a force (F) may be applied (e.g., by an external fixture) on to the top of cover 14 toward open cavity 18 during the brazing process. As noted above, in some examples, the brazing process to form the braze joint(s) that attach cover 14 to outer shell 12 may also be used to form the braze joints that attach core components to each other and/or inner wall 40 of cavity 18.

FIGS. 13A and 13B are conceptual diagrams illustrating heat exchanger 70 after cover 14 has been attached to outer shell 12 to enclose core components 16 within cavity 18. In FIG. 13A, a portion of outer shell 12 is not shown to illustrate core components 16 within cavity 18. FIG. 13B illustrates a magnified view of a portion of FIG. 13A.

Various examples have been described. These and other examples are within the scope of the following claims.

What is claimed is:

1. A method of assembling a heat exchanger, the method comprising:

inserting heat exchanger core components into an open cavity of a preformed outer shell, wherein the outer shell defines one or more alignment features on an inner wall of the open cavity configured to align the heat exchanger core components within the open cavity when inserted in the open cavity, the heat exchanger core components comprising a layer of hot passageway components configured to be separated from a layer of cold passageway components by a tube sheet, wherein the heat exchanger core components comprise a plurality enclosure bars, a plurality of fins, and a plurality of tube sheets, the plurality of tube sheets including the tube sheet; and attaching a cover to the outer shell via one or more braze joints to enclose the heat exchanger core components within the open cavity of the outer shell, wherein the one or more alignment features comprise one or more grooves in the inner wall of the preformed outer shell, wherein inserting the heat exchanger core components into the open cavity of the preformed outer shell comprises inserting an end portion of an enclosure bar of the plurality of enclosure bars into a respective groove of the one or more grooves in the inner wall of the preformed outer shell.

2. The method of claim 1, further comprising attaching the end portion of the enclosure bar to the outer shell within the respective groove via one or more braze joints.

3. The method of claim 1, wherein the heat exchanger core components, when enclosed within the open cavity of the preformed outer shell, alternate between at least one tube sheet of the plurality of tube sheets and a layer including a respective enclosure bar of the plurality of enclosure bars and a respective fin of the plurality of fins.

4. The method of claim 1, further comprising attaching, when enclosed within the open cavity of the preformed outer shell, the heat exchanger core components to each other and the heat exchanger core components to the inner wall of the preformed outer shell via one or more braze joints.

5. The method of claim 4, wherein attaching the cover to the preformed outer shell via the one or more braze joints and attaching the heat exchanger core components to each other and to the inner wall of the preformed outer shell via the one or more braze joints comprises heating the cover and the preformed outer shell with the heat exchanger core components enclosed in the open cavity to form a first braze joint between the cover and the preformed outer shell, a second braze joint between at least two of the heat exchanger core components, and a third braze joint between at least one of the heat exchanger core components and the inner wall of the open cavity upon cooling.

6. The method of claim 1, wherein the preformed outer shell defining the open cavity is formed of a unitary structure.

7. The method of claim 1, further comprising forming the preformed outer shell via an additive manufacturing process.

8. The method of claim 1, wherein the alignment features are configured to aid in retention of the core components within the open cavity during operation of the heat exchanger.

9. A heat exchanger assembly comprising:
an outer shell defining a cavity;
heat exchanger core components within the cavity of the outer shell, wherein the heat exchanger core components include a layer of hot passageway components configured to be separated from a layer of cold passageway components by a tube sheet, and wherein the heat exchanger core components comprise a plurality enclosure bars, a plurality of fins, and a plurality of tube sheets, the plurality of tube sheets comprising the tube sheet; and
a cover configured to be attached, via one or more braze joints, to the outer shell to enclose the heat exchanger core components within the cavity, wherein the outer shell defines one or more alignment features on an inner wall of the open cavity configured to align the heat exchanger core components within the open cavity when inserted in the open cavity, wherein the one or more alignment features comprise one or more grooves in the inner wall of the outer shell, and wherein an end portion of an enclosure bar of the plurality of enclosure bars is located within a respective groove of the one or more grooves in the inner wall of the outer shell.

10. The heat exchanger of claim 9, wherein the heat exchanger core components are attached to the outer shell via one or more braze joints at the alignment features defined by the outer shell.

11. The heat exchanger of claim 9, further comprising a first braze joint between the cover and the outer shell, a second braze joint between at least two of the heat exchanger core components, and a third braze joint between at least one of the heat exchanger core components and the inner wall of the open cavity.

12. The heat exchanger of claim 9, wherein the outer shell defining the open cavity is formed of a unitary structure.

13. The heat exchanger of claim 9, wherein the one or more alignment features are configured to aid in retention of the core components within the open cavity during operation of the heat exchanger.

14. The heat exchanger of claim 9, wherein the core components are attached to each other and to the outer shell via one or more braze joints.

15. The heat exchanger of claim 9, wherein the layer of hot passageway components include a first enclosure bar of the plurality of enclosure bars and a first fin of the plurality of fins, and wherein the layer of cold passageway components include a second enclosure bar of the plurality of enclosure bars and a second fin of the plurality of fins.

16. The method of claim 1, wherein the layer of hot passageway components include a first enclosure bar of the plurality of enclosure bars and a first fin of the plurality of fins, and wherein the layer of cold passageway components include a second enclosure bar of the plurality of enclosure bars and a second fin of the plurality of fins.

17. A heat exchanger assembly comprising:
an outer shell defining a cavity;
heat exchanger core components within the cavity of the outer shell, wherein the heat exchanger core components include a layer of hot passageway components configured to be separated from a layer of cold passageway components by a tube sheet, wherein the heat exchanger core components comprise a plurality enclosure bars, a plurality of fins, and a plurality of tube sheets, the plurality of tube sheets including the tube sheet; and
a cover configured to be attached, via one or more braze joints, to the outer shell to enclose the heat exchanger core components within the cavity, wherein the outer shell defines one or more alignment features on an inner wall of the open cavity configured to align the heat exchanger core components within the open cavity when inserted in the open cavity,
wherein the heat exchanger core components within the cavity of the outer shell alternate between at least one tube sheet of the plurality of tube sheets and a layer including a respective enclosure bar of the plurality of enclosure bars and a respective fin of the plurality of fins.

18. The heat exchanger of claim 17, wherein the heat exchanger core components are attached to the outer shell via one or more braze joints at the alignment features defined by the outer shell.

19. The heat exchanger of claim 17, wherein the one or more alignment features comprise one or more grooves in the inner wall of the outer shell, and wherein an end portion of the respective enclosure bar of the plurality of enclosure bars is located within a respective groove of the one or more grooves in the inner wall of the outer shell.

20. The heat exchanger of claim 17, wherein the core components are attached to each other and to the outer shell via one or more braze joints.

* * * * *